United States Patent
Cherniak et al.

(10) Patent No.: US 10,305,377 B2
(45) Date of Patent: May 28, 2019

(54) DIGITAL CONTROLLER FOR SWITCHED CAPACITOR DC-DC CONVERTER

(71) Applicant: Infineon Technologies AG, Neubiberg (DE)

(72) Inventors: Kyrylo Cherniak, Villach (AT); Werner Hoellinger, Klagenfurt (AT); Gerhard Maderbacher, Gleisdorf (AT); Stefano Marsili, Faak am See (AT); Volha Subotskaya, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/710,502

(22) Filed: Sep. 20, 2017

(65) Prior Publication Data
US 2018/0013342 A1    Jan. 11, 2018

Related U.S. Application Data

(63) Continuation-in-part of application No. 13/283,558, filed on Oct. 27, 2011, now Pat. No. 9,800,150.

(51) Int. Cl.
*H02M 3/07* (2006.01)
*H02M 1/14* (2006.01)
*H02M 1/00* (2006.01)

(52) U.S. Cl.
CPC .............. *H02M 3/07* (2013.01); *H02M 1/14* (2013.01); *H02M 2001/0054* (2013.01); *Y02B 70/1491* (2013.01)

(58) Field of Classification Search
CPC .......... H02M 3/07; H02M 3/073; H02M 7/10; H02M 7/106; H02M 7/103; H02M 3/157; H02M 3/158
See application file for complete search history.

(56) References Cited

U.S. PATENT DOCUMENTS

| 5,694,308 A | 12/1997 | Cave |
| 6,169,673 B1 | 1/2001 | McIntyre et al. |

(Continued)

FOREIGN PATENT DOCUMENTS

| CN | 1445928 A | 10/2003 |
| CN | 101009464 A | 8/2007 |

(Continued)

OTHER PUBLICATIONS

Merriam Webster—definition of load; www.merriam-webster.com/dictionary/load.

(Continued)

*Primary Examiner* — Kyle J Moody
(74) *Attorney, Agent, or Firm* — Shumaker & Sieffert, P.A.

(57) ABSTRACT

Representative implementations of devices and techniques may minimize switching losses and voltage ripple in a switched capacitor de-de converter. A digital controller is used to control switching, based on an existing load. In some examples, the digital controller may insert a dead-time phase in a switching period, which may reduce voltage ripple for a low output load current. In other examples, the digital controller may adjust the conductance of a plurality of sub-switches, where the plurality of sub-switches may include one or more sub-switches that have a higher on-resistance than other sub-switches. For example, a sub-switch may have an on-resistance that is a multiple of the on-resistance of other sub-switches.

20 Claims, 18 Drawing Sheets

(56) References Cited

U.S. PATENT DOCUMENTS

| | | |
|---|---|---|
| 6,801,078 B2 | 10/2004 | Allum |
| 6,920,055 B1 | 7/2005 | Zeng et al. |
| 6,967,519 B2 | 11/2005 | Nakayama et al. |
| 6,995,995 B2 | 2/2006 | Zeng et al. |
| 7,250,810 B1 | 7/2007 | Tsen |
| 7,408,332 B2 | 8/2008 | Yee |
| 7,479,770 B2 | 1/2009 | Kohout et al. |
| 7,511,560 B2 | 3/2009 | Yen et al. |
| 7,859,229 B2 | 12/2010 | Hoshikawa et al. |
| 7,872,884 B2 * | 1/2011 | Parramon ............... A61N 1/378 323/265 |
| 7,977,921 B2 | 7/2011 | Bahai et al. |
| 7,995,364 B2 | 8/2011 | Shiu |
| 8,085,566 B2 | 12/2011 | Horiguchi et al. |
| 8,264,273 B2 | 9/2012 | MacFarlane |
| 9,007,791 B2 | 4/2015 | Marsili et al. |
| 2003/0180997 A1 | 9/2003 | Nakayama et al. |
| 2005/0093615 A1 | 5/2005 | Saiki et al. |
| 2007/0176671 A1 | 8/2007 | Ishida |
| 2008/0231347 A1 | 9/2008 | Yen et al. |
| 2008/0309302 A1 * | 12/2008 | Chen ...................... H02M 1/38 323/282 |
| 2009/0039947 A1 | 2/2009 | Williams |
| 2010/0156517 A1 | 6/2010 | Lin et al. |
| 2010/0188138 A1 | 7/2010 | Tran et al. |
| 2011/0128761 A1 | 6/2011 | Ripley et al. |
| 2011/0279173 A1 | 11/2011 | Singnurkar |
| 2012/0069618 A1 | 3/2012 | Yim et al. |
| 2012/0235730 A1 | 9/2012 | Quan et al. |
| 2012/0249103 A1 | 10/2012 | Latham, II et al. |
| 2012/0249224 A1 | 10/2012 | Wei et al. |
| 2013/0106382 A1 | 5/2013 | Marsili et al. |
| 2015/0222187 A1 | 8/2015 | Marsili et al. |

FOREIGN PATENT DOCUMENTS

| | | |
|---|---|---|
| CN | 101136586 A | 3/2008 |
| CN | 101483424 A | 7/2009 |
| CN | 101501601 A | 8/2009 |
| CN | 201590809 U | 9/2010 |

OTHER PUBLICATIONS

Prosecution History from U.S. Appl. No. 13/283,555, dated from Nov. 23, 2012 through Dec. 10, 2014, 136 pp.

Prosecution History from U.S. Appl. No. 14/685,911, dated from Dec. 13, 2016 through Jul. 27, 2017, 41 pp.

Prosecution History from U.S. Appl. No. 13/283,558, dated Nov. 28, 2012 through Jun. 16, 2017, 177 pp.

* cited by examiner

DIGITAL CONTROLLER FOR SWITCHED CAPACITOR DC-DC CONVERTER

This application is a continuation-in-part of application Ser. No. 13/283,558, filed on Oct. 27, 2011, the entire content of which is incorporated herein by reference.

TECHNICAL FIELD

The disclosure relates to power converter circuits.

BACKGROUND

Various mobile or portable electronic devices may have reduced power consumption by operating some of the systems within these devices at low voltages (e.g., 3.0 volts, 1.5 volts, etc.). Such electronic devices often use direct current to direct current converters ("dc to dc converters" or "dc-dc converters") to "step down" voltages available from their power supplies to the lower voltages used by these systems.

Typical dc-dc converters include switched capacitor dc-dc converters, which may contain one or more switches controlling one or more "flying capacitors." The switches determine when the flying capacitors charge and discharge to supply power to the load. The flying capacitors may charge from a regulated current source and may discharge at least in part to a "buffer" or output capacitor coupled in parallel with the load.

However, switched capacitor dc-dc converters generally suffer from switching losses. Switching losses include power loss resulting from power used to operate the switches. These switching losses may not scale with the load current being supplied, since in many cases, the operation of the switches is consistent regardless of the load. For example, the switches may require the same energy per switching event regardless of the load, and a same number of switches may be operative for a wide range of load currents supplied by the dc-dc converter.

SUMMARY

In general, the disclosure is directed to techniques and/or devices to provide control of switching characteristics in a switched capacitor dc-dc converter. In various implementations, the switching characteristics are modified based on load characteristics (e.g., magnitude of the load current). The switching characteristics may be modified to reduce, minimize, or eliminate switching losses as well as reduce output voltage ripple in the dc-dc converter.

In one example, the disclosure is directed to a system comprising: a direct current to direct current converter (DC-DC converter), including: an energy storage element, a first plurality of switches coupled to a first terminal of the energy storage element, wherein an on-resistance of at least one switch of the first plurality of switches is a multiple of an on-resistance of another switch of the first plurality of switches, and a second plurality of switches coupled to a second terminal of the energy storage element, wherein an on-resistance of at least one switch of the second plurality of switches is a multiple of an on-resistance of another switch of the second plurality of switches. The conductance of each one of the first and second plurality of switches is adjustable. The system may also include a digital controller configured to independently control the conductance of each one of the first and second plurality of switches to switch an electrical connection between the energy storage element and an output load of the DC-DC converter between a parallel electrical connection and a series electrical connection by modulation of a switch timing of each one of the first and second plurality of switches. The modulation of the switch timing is defined by adjustment of a gate-source voltage of each one of the first and second plurality of switches, and the digital controller is configured to program a first sub-set of the first and second plurality of switches to rest in a fixed state while a second sub-set of the first and second plurality of switches toggles states during a preset number of switching cycles.

In another example, the disclosure is directed to an apparatus comprising: an energy storage capacitor, a first plurality of transistors coupled to a first terminal of the energy storage capacitor, a second plurality of transistors coupled to a second terminal of the energy storage capacitor, and a digital controller configured to independently control the conduction of each one of the first and second plurality of transistors according to a switching period. The switching period comprises: a charge phase of the energy storage capacitor, a discharge phase of the energy storage capacitor, and a dead-time phase, wherein a duration of the charge phase is approximately equal to a duration of the discharge phase In another example, the disclosure is directed to a digital controller circuit configured to independently control a conductance of each one of a plurality of switches by modulation of a switch timing of each one of the plurality of switches, wherein the plurality of switches is configured to switch an electrical connection between an energy storage element and an output load of a DC-DC converter between a parallel electrical connection and a series electrical connection, and wherein the digital controller modulates the switch timing based on a magnitude of output current to the output load.

In another example, the disclosure is directed to method comprising: determining, by a digital controller circuit, a magnitude of an output load current to an output load of a DC to DC (DC-DC) converter, adjusting, by the digital controller circuit, a conductance of a plurality of switches, wherein the plurality of switches is configured to switch an electrical connection between an energy storage element and the output load of the DC-DC converter between a parallel electrical connection and a series electrical connection, wherein the digital controller circuit configured to independently control the conductance of each one of the plurality of switches by modulation of a switch timing of each one of the plurality of switches, and wherein the digital controller circuit modulates the switch timing based on the magnitude of output load current to the output load.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1A:
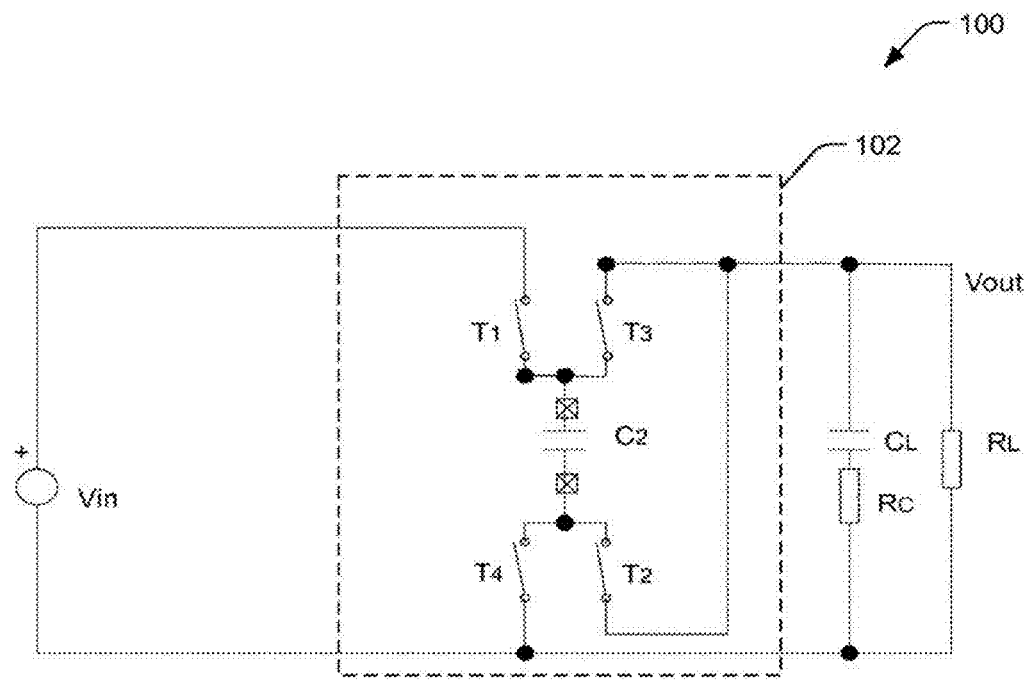
FIG. 1A is schematic of an example switched capacitor dc-dc converter in which the techniques in accordance with the present disclosure may be implemented.

Representative implementations of techniques and/or devices provide control of switching characteristics in a switched capacitor dc-dc converter. In various implementations, the switching characteristics are modified based on load characteristics (e.g., magnitude of the load current). The switching characteristics may be modified to reduce, minimize, or eliminate switching losses in the dc-dc converter.

A typical switched capacitor dc-dc converter contains one or more switches controlling one or more energy storage capacitors (aka. "flying capacitors"). In one implementation, the operation of the switches (i.e., switching "on" and "off" the switches) may be modified by cutting in and out individual switches or groups of switches based on the load. For example, a minimum number of switches may be operative at a given time, for a given load, with other switches being fixed in an open or a closed state. With changes in the load, one or more switches may be cut in or cut out to accommodate the changed load, resulting in more or less switches being operative and the remaining switches being in a fixed state.

In an alternate implementation, one or more switches may be comprised of a plurality of individually operable sub-switches. Individual sub-switches or groups of sub-switches may be operative at a given time for a given load, with other switches and/or sub-switches being fixed in an open or a closed state. In further implementations, the switches and/or sub-switches may be selected for operation using a digital controller, for example. A regulated output voltage may be finely adjusted and switching losses may be closely managed, based on a number of switches and/or sub-switches used in a dc-dc converter. For example, a greater number of sub-switches used may allow for a finer adjustment to the regulated output voltage and tighter control of switching losses.

Various implementations of switching control for a switched capacitor dc-dc converter are discussed in this disclosure. Techniques and devices of switching control are discussed with reference to example dc-dc converter circuit schematics and various related waveforms illustrated in the figures. The techniques and devices discussed may be applied to any of various dc-dc converter designs, circuits, and devices and remain within the scope of the disclosure.

Advantages of the disclosed techniques and devices are varied, and include: 1) accurate and precise switching control in low current operation; 2) quantization of selected switches, numbers of switches operated, and switch operation control voltages; 3) improved efficiency of the dc-dc converter at low current loads; 4) reduced energy used for switching events; 5) an ability to select sub-sets of switches for operation while remaining switches are fixed; and 6) no additional regulated current sources outside the switching network are necessarily used. Advantages of the disclosed techniques may be more apparent in applications and designs where current magnitudes are designed to be lower and frequencies are designed to be higher.

Implementations are explained in more detail below using a plurality of examples. Although various implementations and examples are discussed here and below, further implementations and examples may be possible by combining the features and elements of individual implementations and examples.

Example Switched Capacitor DC-DC Converter

FIG. 1A is a schematic drawing showing an illustrative dc-dc converter circuit 100, wherein techniques and/or devices to provide switching control (e.g., programmable switching, switch timing, etc.) may be employed. It is to be understood that the techniques and/or devices may be implemented as part of the dc-dc converter circuit 100, or as part of another system (for example as a peripheral to a dc-dc converter 100, etc.). The illustrated dc-dc converter in FIG. 1A is shown and described in terms of a "buck" device, which reduces the input DC voltage (VIN) to a desired lower output DC voltage (VOUT). This illustration is, however, for ease of discussion. The techniques and devices described herein with respect to switching control for dc-dc converters is not limited to a buck device, and may be applied to other types of dc-dc converters (e.g., boost, buck-boost, etc.) without departing from the scope of the disclosure. While the disclosure discusses switched capacitor type dc-dc converters, various other types of dc-dc converters may employ techniques and/or devices discussed herein. Accordingly, the generic term "dc-dc converter" is used throughout.

As shown in FIG. 1A, an example dc-dc converter 100 may be designed with a network 102 of switches (such as switches T1, T2, T3, and T4) and energy storage elements (such as energy storage element C2). In an implementation, one or more of the switches T1-T4 may control the charging and/or discharging of the energy storage element C2. The one or more switches T1-T4 may do so by opening and closing according to a timing scheme to allow charging from a voltage source (such as VIN), and discharging to a load (shown as load RL). In FIG. 1A, four switches (T1, T2, T3, and T4) are illustrated for ease of discussion. In various implementations, more switches or fewer switches may also be used in a dc-dc converter 100.

The load RL may represent a device, a system, or the like, that is supplied with power by the dc-dc converter 100, and consumes a current load. For example, the load RL may represent a sub-system of a communications device, a microcontroller, or the like. In some implementations, as shown in FIG. 1A, an example dc-dc converter 100 may include a load capacitance CL (i.e., buffer capacitor) and an associated impedance RC in parallel with the load RL. In such implementations, the energy storage element C2 also discharges energy to the load capacitance CL, making additional energy available to the load RL, and buffering load variations. The output of the dc-dc converter 100 (VOUT) is shown in the example of FIG. 1A as the voltage across the load RL.

In various implementations, switches T1-T4 may be implemented with metal-oxide semiconductor (MOS) devices, such as P-type Metal Oxide Semiconductor (PMOS) and/or N-type Metal Oxide Semiconductor (NMOS) devices or transistors, controlled via a clock signal, for example. In other implementations, switches T1-T4 may be implemented using diodes, other types of transistors, or the like. Energy storage device C2 may be implemented with a capacitor, or a like energy storage device.

The number of energy storage elements C2 used in an example dc-dc converter may be chosen based on the ratio of input voltage (VIN) to output voltage (VOUT), to maximize the energy transfer from the input source to the output load. In example implementations, for a ratio of 2:1 (VIN≥2× VOUT), one energy storage element C2 may be sufficient, and for a ratio of 3:1 (VIN≥3× VOUT), two energy storage elements C2 may be used, and so on. Accordingly, additional energy storage elements C2 may require additional switches T1-T4 (see, for example, network 104 of FIG. 1B).

Example operation may be illustrated using the circuit of FIG. 1A, showing an implementation of a 2:1 ratio dc-dc converter 100. The described operation is not limited to the circuit shown, and may also apply to various other circuit configurations of dc-dc converters. Included are an energy storage element C2, switches T1 and T3 coupled to a first terminal of C2, and switches T2 and T4 coupled to a second terminal of C2.

By opening and closing the switches, the first terminal of C2 can be connected with the switch T1 to the positive terminal of the input source VIN, or can be connected with switch the T3 to the positive terminal of the buffer capacitor CL (and VOUT). The second terminal of C2 can be connected either to the negative terminal of the input source VIN via T4 or to the positive terminal of the buffer capacitor CL (and VOUT) via T2. In an implementation, one or more of the switches T1-T4 may be programmable to rest in a fixed state while one or more others of the switches toggle states during a preset number of switching cycles.

An energy transfer may be obtained by alternating two different switch configurations as described below. In a first phase T1 and T2 are closed and T3 and T4 are open. The energy storage element C2 is in series to the buffer capacitor CL. Energy flows from the source VIN to the output and charges C2. During the second phase, T3 and T4 are closed and T1 and T2 are open. The energy storage element C2 is now in parallel to the buffer capacitor CL. The energy stored in energy storage element C2 during the first phase is transferred to the buffer capacitor CL and to the load RL.

In one implementation, during steady state, the energy storage element C2 and the buffer capacitor CL will have a voltage which is substantially equal to VOUT. Therefore, during the first phase when the energy storage element C2 and the buffer capacitor CL are connected in series, an energy transfer from the source VIN occurs when VIN≥2× VOUT. In an implementation, the closer VIN is to 2× VOUT, the more efficient the energy transfer will be.

For the purposes of this discussion, it is assumed that there is an ideal transition between the two phases described above. However, the techniques described are not limited to this case. In some implementations, additional phases might be used between the two phases in order to avoid short circuit situations. The inclusion of additional phases remains within the scope of the disclosure.

Figure 1B:
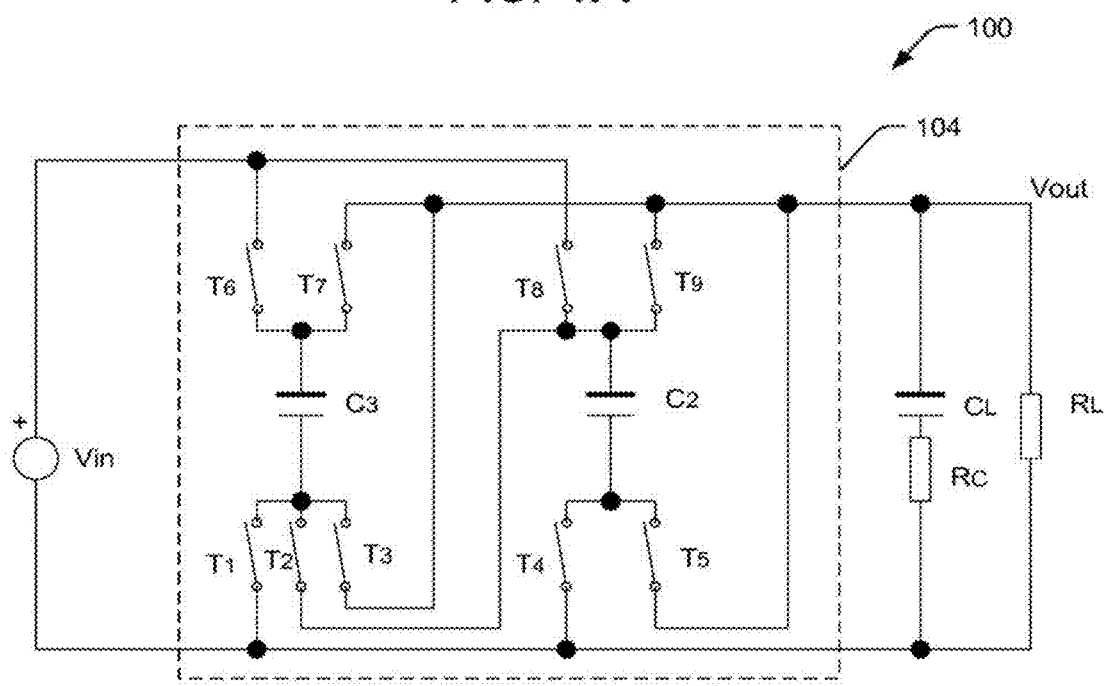
FIG. 1B is a schematic of an example switched capacitor dc-dc converter having a plurality of energy storage capacitors and a plurality of switches according to an implementation.

FIG. 1B is a schematic of an example switched capacitor dc-dc converter having a network 104 including a plurality of energy storage elements (C2 and C3) and a plurality of switches (T1-T9) according to an implementation. As shown in FIG. 1B, the switches of a dc-dc converter 100 may be configured in a first switching configuration such that the energy storage elements C2 and C3 are in series, and may be configured in a second switching configuration such that the energy storage elements C2 and C3 are in parallel. Further, the switches of a dc-dc converter 100 may also be configured in a third switching configuration such that the energy storage elements C2 and C3 are in series with the output capacitor CL, and may be configured in a fourth switching configuration such that the energy storage elements C2 and C3 are in parallel with the output capacitor CL. Alternate or additional configurations are also possible in other implementations.

In various implementations, the principles of operation discussed above with reference to FIG. 1A apply to the dc-dc converter 100 of FIG. 1B. Additionally, in various implementations, at least three modes of operation may be realized with the circuit of FIG. 1B.

Figure 2A:
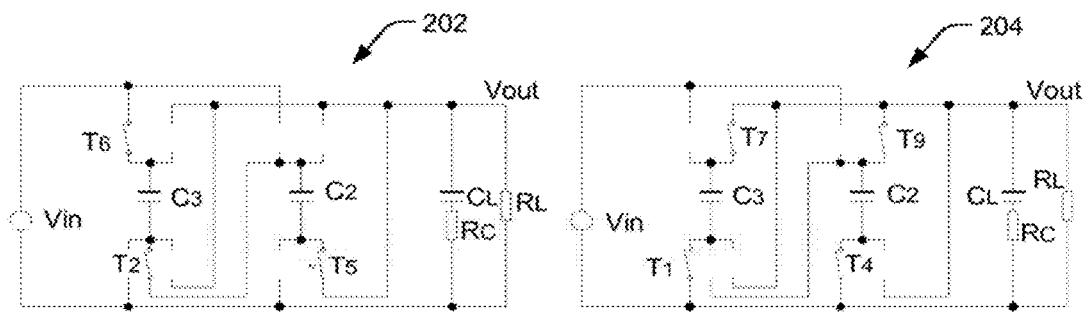
FIG. 2A is a schematic drawing of an example first mode of operation of the dc-dc converter circuit of FIG. 1B.

Referring to FIG. 2A, a first example mode of operation is described as follows. The first mode uses a 3:1 ratio (VIN≥3× VOUT). In a first phase, illustrated in FIG. 2A as circuit configuration 202, switches T6, T2, and T5 are closed, and the remaining switches are open. The energy storage elements C2 and C3 are in series to the buffer capacitor CL. Energy flows from the source VIN to the output VOUT, and charges C2 and C3. During the second phase, illustrated in FIG. 2A as circuit configuration 204, switches T1, T7, T9 and T4 are closed, with the remaining switches open. The energy storage elements C2 and C3 are now in parallel to the buffer capacitor CL. The energy stored in energy storage elements C2 and C3 during the first phase is transferred to the buffer capacitor CL.

In steady state, energy storage elements C2 and C3 and buffer capacitor CL will have a voltage which is approximately equal to VOUT. Therefore, during the first phase, an energy transfer from the source VIN is accomplished when VIN≥3× VOUT. The closer VIN is to 3× VOUT, the more efficient the energy transfer will be.

Figure 2B:
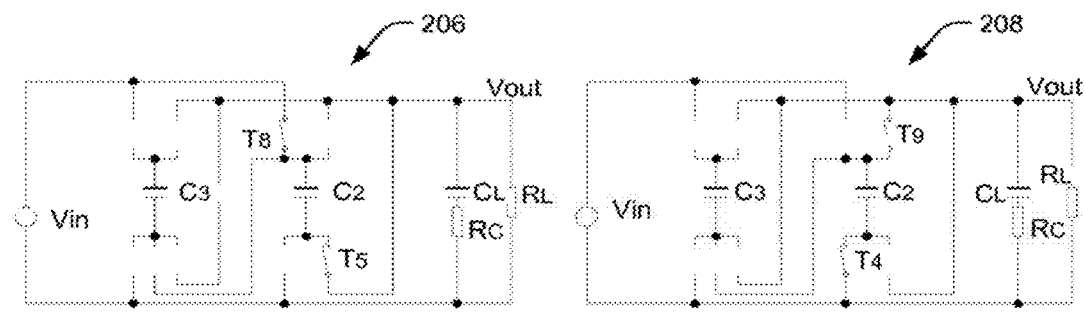
FIG. 2B is a schematic drawing of an example second mode of operation of the dc-dc converter circuit of FIG. 1B.

Referring to FIG. 2B, a second example mode of operation is described as follows. The second mode uses a 2:1 ratio (VIN≥2× VOUT). In the second mode, only one energy storage element is used, for instance, C2. In a first phase, illustrated in FIG. 2B as circuit configuration 206, switches T4 and T9 are open and switches T8 and T5 are closed. The energy storage element C2 is in series to the buffer capacitor CL. Energy flows from the source VIN to the output VOUT and charges energy storage element C2. During the second phase, illustrated in FIG. 2B as circuit configuration 208, switches T8 and T5 are open and switches T4 and T9 are closed. The energy storage element C2 is now in parallel to the buffer capacitor CL. The energy stored in energy storage element C2 during the first phase is transferred to the buffer capacitor CL.

In steady state, energy storage element C2 and buffer capacitor CL will have a voltage which is approximately equal to VOUT. Therefore, during the first phase, an energy transfer from the source VIN is accomplished when VIN≥2× VOUT. The closer VIN is to 2× VOUT, the more efficient the energy transfer will be.

In alternate implementations, the switches connected to the second energy storage element C3 do not necessarily need to be all open as in FIG. 2B. A special (static) configuration of the switches coupled to C3 can be selected in order to make a transition from the second mode to the first mode or to the third mode smoother.

Figure 2C:
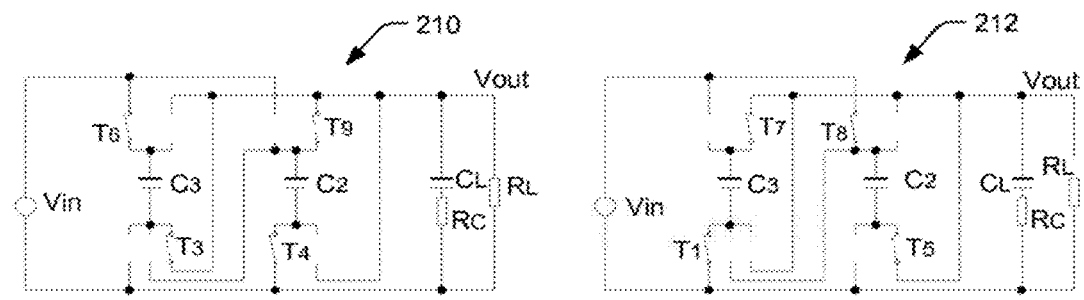
FIG. 2C is a schematic drawing of an example third mode of operation of the dc-dc converter circuit of FIG. 1B.

Referring to FIG. 2C, a third example mode of operation is described as follows. The third mode also uses a 2:1 ratio (VIN≥2× VOUT), but uses both energy storage elements C2 and C3 in a "push pull" configuration.

The third mode is generally equivalent to the second mode, but in this case, both energy storage elements C2 and C3 are used. In the first phase, illustrated in FIG. 2C as circuit configuration 210, while C3 is charging, C2 is discharging. In the second phase, illustrated in FIG. 2C as circuit configuration 212, while C3 is discharging, C2 is charging. The third mode has a current capability which is double compared to the second mode.

As above, for the purposes of this discussion, it is assumed that there is an ideal transition between the two phases of each mode described above. However, the techniques described are not limited to this case. In some implementations, additional phases in one or more of the modes might be used between the two phases in order to avoid short circuit situations. The inclusion of additional phases in one or more of the modes remains within the scope of the disclosure.

Additionally, other modes of operation are also within the scope of the disclosure, including modes using other voltage ratios (including 1:1 ratios or step-up ratios), modes including additional energy storage elements and/or switches, and modes including other components having similar operation. Further, dc-dc converters having additional components to the schematics are also within the scope of the disclosure.

Example Switching Control

In an implementation, one or more of the switches T1-T9 may function similar to a variable resistor. For example, when one or more switches are implemented as metal-oxide-semiconductor (MOS) devices, the gate-source voltage of the MOS devices may be analogous to a variable impedance of the switch. When a switch is open, the impedance of the switch is very high (e.g., mega-ohms range). Conversely, when the switch is closed, the impedance of the switch (aka. "on" resistance (RON)) is very low. In various implementations, the value of RON for a switch determines a maximum current the dc-dc converter 100 can transfer from the input source to the output (see FIGS. 1A and 1B).

In an implementation having a single energy storage element C2 as shown in FIG. 1A, assuming that all switches have the same value of RON, the maximum current that can be transferred can be expressed as:

$$Imax=(VIN-2\times VOUT)/2/(2\times RON) \quad (1)$$

For example, assuming VIN=3.3V, VOUT=1.5 V, RON=0.5 ohm, the maximum current that an example dc-dc converter of FIG. 1A provides to a load is 150 mA. If a requested current load is larger than 150 mA, it may not be possible to obtain the desired output voltage VOUT=1.5V. On the other hand, for all load currents below 150 mA it may be possible to set the output voltage VOUT=1.5V. Assuming instead that the requested current load is 50 mA, the output voltage obtained in open loop by switching between the two phases described above may be expressed as:

$$Vout\_ol=(VIN-Iload\times 2\times(2\times RON))/2=1.6\ V \quad (2)$$

This yields an output voltage that is 100 mV larger than the requested 1.5V. Thus, techniques of adjusting switch impedance described below may also be used to control the output voltage as necessary.

In various implementations, the on resistance RON of one or more of the switches T1-T9 may be selected and the impedance of the one or more switches T1-T9 adjusted. In one implementation, the impedance of one or more of the switches T1-T9 is adjustable based on the load coupled to the output of the dc-dc converter 100.

Figure 3A:
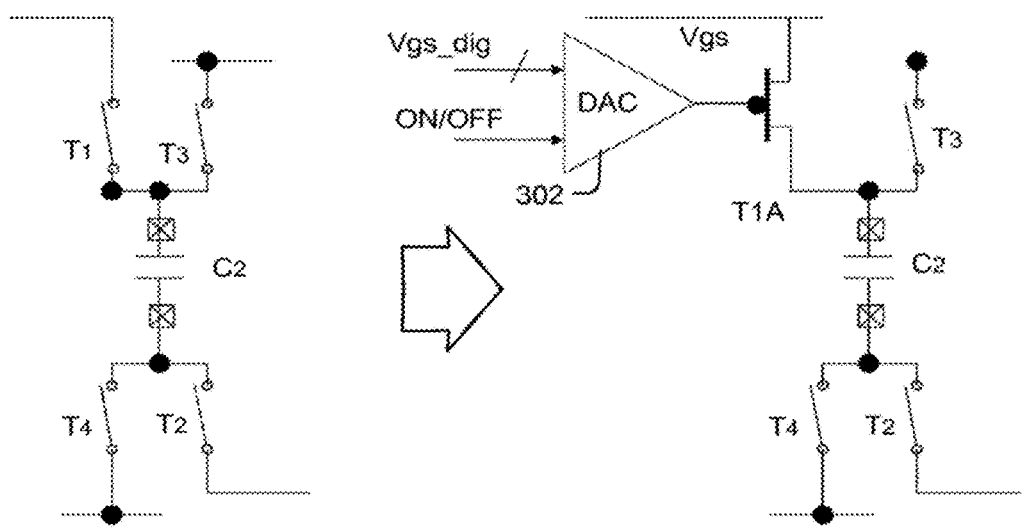
FIG. 3A is a schematic drawing of a portion of a switched capacitor dc-dc converter using a digital to analog converter according to an implementation.

In one implementation, at least one of the switches T1-T9 includes a digital-to-analog converter (DAC) 302 arranged to adjust the impedance of the switch. This is illustrated in FIG. 3A, where switch T1 is shown implemented as a MOS transistor T1A, for example. The transistor T1A is turned "on," (i.e., T1A is in a conducting state), meaning the switch T1A is closed, when the gate-source voltage (VGS) is large enough. In the example shown in FIG. 3A, the VGS of switch T1A for the "on" phase can be programmed by the DAC, effectively adjusting the impedance of the switch T1A. The VGS of the switch T1A for the "off" phase is the voltage below the threshold of the T1A MOS device.

Returning to the example above, with a dc-dc converter 100 having a requested current load of 50 mA, and assuming the on resistance of switch T2 (RON_2) is 0.5 ohm, the on resistance of the switch T1A (RON_1A) may be determined by substituting in equation (2):

$$Iload=(VIN-2\times VOUT)/2/(RON\_1A+RON\_2).$$

Solving for RON_1A yields:

$$RON\_1A=(VIN-2\times VOUT-2\times RON\_2\times Iload)/(2\times Iload)$$

$$RON\_1A=2.5 \text{ ohm}.$$

Thus, in an implementation, the impedance of a switch implemented with a MOS device, may be determined using the equation (3) below:

$$R_{ON} = \frac{1}{\mu C_{OX} \frac{W}{L}(V_{GS} - V_{TH})}$$

Thus, a DAC 302 may be used, for example, to adjust the VGS of a switch and yield the desired impedance for the switch. In various implementations, several or all of the switches T1-T9 of a dc-dc converter 100 may be implemented using a DAC 302 arranged to adjust the impedance of the switches. In some implementations, one or more of the switches T1-T9 may be selected for impedance adjustment based on a digital word. Further, each of the switches may be selected for impedance adjustment based on a separate digital word associated to each respective switch. This may be the case when each switch is implemented with a DAC 302. A digital word may be comprised of a preset number of bits, where each of the bits may represent switching information, such as: identifying the switch, representing a desired impedance for the switch, conveying other control information, etc. In some implementations, the digital word may be an input to the DAC 302 (such as Vgs_dig in FIG. 3A).

In various implementations, the techniques described above may be applied to the conductance (G=1/RON) of switches T1-T9 during their "on" state, for example.

Figure 3B:
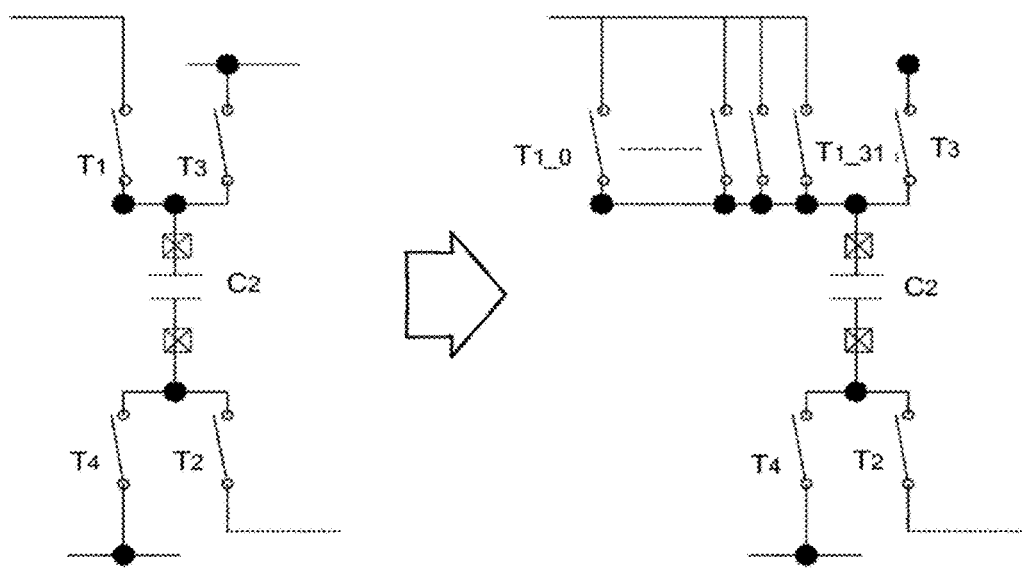
FIG. 3B is a schematic drawing of a portion of a switched capacitor dc-dc converter using a plurality of sub-switches according to an implementation.

In another implementation, as shown in FIG. 3B, a switch (switch T1, for example) may be implemented using a plurality of independently controllable sub-switches (T1_0-T1_31). In an implementation, the maximum impedance of each individual sub-switch is substantially equivalent to the maximum impedance of the switch (T1, for example) divided by the number of sub-switches implemented to represent switch T1. In another implementation, one or more of the sub-switches may be weighted (e.g., binary weighted).

In some implementations, the sub-switches (T1_0-T1_31) are arranged in parallel as shown in FIG. 3B. In other implementations, the sub-switches may be arranged in other configurations, including combinations of series and parallel arrangements. In a further implementation, the impedance or conductance of a sub-set of the sub-switches (or all of the sub-switches) may be adjustable as described above. The schematic of FIG. 3B shows 32 sub-switches (T1_0-T1_31) for illustration and discussion. In alternate implementations, fewer or greater numbers of sub-switches may be employed. The number of sub-switches used may impact the degree of switch losses that are experienced by a dc-dc converter 100. For example, with a greater number of sub-switches, a finer adjustment of sub-switches being operable for a given load may be possible. Accordingly, fewer or smaller switches and/or sub-switches may be used; resulting in reduced power used by the switches or sub-switches, and reduced switching losses.

In an implementation, individual sub-switches or groups (sub-sets) of sub-switches may be programmed to be operative (i.e., switching or toggling states) at a given time for a given load, with other sub-switches being fixed in an open or a closed state. For example, fewer sub-switches may be operative for a smaller load than for a greater load. Thus, in various implementations, optimization of the number of operative sub-switches may be performed in each switching cycle. In further implementations, the switches and/or sub-switches may be selected for operation using digital logic or a digital controller, for example, and set to toggle or remain fixed for a preset number of switching cycles, based on a load.

Returning again to the example above, setting the appropriate VGS of a switch T1 is substantially equivalent to turning on a sub-set of sub-switches (T1_0-T1_31) representing T1. For example, to achieve the equivalent of the RON_1A=2.5 ohm, 6.4 sub-switches of the 32 sub-switches (as in FIG. 3B) may be turned on, where each sub-switch has an impedance of RON_i=16 ohm. To obtain this sub-switch configuration, six sub-switches may be turned on, and a seventh sub-switch may be alternately turned on and off with a ratio of 60/40%. This technique is effective using any of the switches T1-T4 in the network 102. Further, the programming technique described is also effective when considering two or more switches operated concurrently.

In some implementations, an impedance or conductance of one or more of the sub-switches (T1_0-T1_31) or a sub-set of the sub-switches may be adjustable based on a digital word. Further, an impedance or conductance of each of the sub-switches (T1_0-T1_31) of a sub-set may be adjustable based on a separate digital word associated to each respective sub-switch. The use of separate digital words for either switches or sub-switches allows for better resolution. For example, with the separate switches or sub-switches having programmable impedances rather than equivalent impedances, a finer resolution may be achieved by combining unlike impedances (associated with respective switches). Again, the number of switches operable (and the associated switching losses) may be based on the load current.

For instance, referring to the circuit of FIG. 1A, and assuming that a digital word is a 6 bits number, 64 different combinations may be realized. Given 32 subsections per switch, as in FIG. 3B, and where P is the digital representation of the switch impedance that is needed to drive a particular load, the number of sub-switch may be selected as:

For T1 and T3 ⌐ floor(P/2)
For T2 and T4 ⌐ floor(P/2)+mod(P,2)

In an implementation, this coding is monotonic and provides 64 impedance values with 32 sub-switches per switch. The method can also be extended to reduce further to 16 sub-sections:

For T1→floor(P/4)
For T2→floor(P/4)+(mod(P,4)>=1)
For T3→floor(P/4)+(mod(P,4)>=2)
For T4→floor(P/4)+(mod(P,4)>=3)

In an implementation, the same technique can also be used to program the four VGS values of the four switches T1-T4. In additional implementations, the same technique can be used to program other switches, such as switches T1-T9 of FIG. 1B, and the like.

Example Implementations

In various implementations, the techniques described above may be used in conjunction with other techniques and/or devices to control switching in a dc-dc converter (such as dc-dc converter 100). For example, in one implementation, a system (such as the system 400 of FIG. 4) may include a dc-dc converter 100, having a switching network 102 (or 104) with switches T1-T4 (or T1-T9) having adjustable impedance or conductance, as described above. The dc-dc converter 100 is not explicitly illustrated in FIG. 4, but is understood to include components as discussed above (and shown in FIGS. 1-3B), or like components. In some implementations, a dc-dc converter 100 includes some or all of the components illustrated in the system 400 of FIG. 4.

A system 400 may include a digital controller 402 arranged to adjust the impedance or conductance of one or more of the switches T1-T9, or all of the switches T1-T9, of the switching network 102 or 104. In various implementations, a digital controller 402 may be arranged to adjust the impedance or conductance of one or more of the switches T1-T9, based on a load RL coupled to an output of the dc-dc converter 100. In one implementation, the digital controller 402 may generate or provide a digital word, as described above, to adjust the impedance or conductance of the switches. The digital controller 402 may generate information such as switch identification, impedance or conductance information of one or more switches, and the like, incorporated within a digital word. In another implementation, the digital controller 402 is arranged to adjust a gate-source voltage of one or more switches implemented as MOS transistors.

In various implementations, a system 400 may include a feedback loop 406 arranged to feed an output voltage of the dc-dc converter 100 back into the digital controller 402. For example, the feedback loop 406 may provide error correction relating to the output voltage of the dc-dc converter 100. In one implementation, the feedback loop 406 feeds the output voltage to the digital controller 402 via an analog to digital converter (ADC) 408. For example, the output voltage VOUT may be sampled by the ADC 408 in preparation for receipt by the digital controller 402. In an alternate implementation, a comparator is used in place of the ADC 408, where the comparator may have 1-bit resolution, for example. In one implementation, the digital controller 402 calculates the value of the impedance or conductance of one or more of the switches T1-T9 in their "on" phase. In another implementation, the digital controller calculates the mode of operation for the dc-dc controller 100 (such as the first, second, or third modes of operation discussed above).

Figure 4:
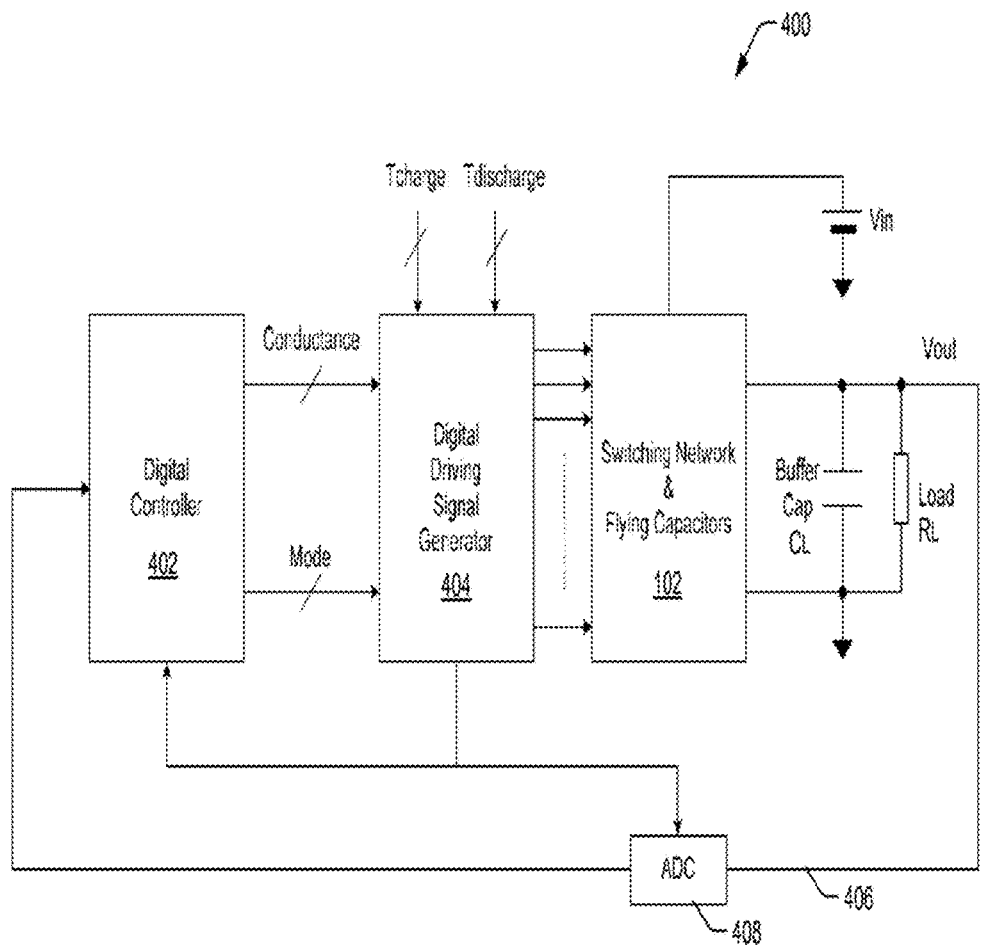
FIG. 4 is a block diagram of a digital regulation loop for a dc-dc converter according to an example implementation.

As shown in FIG. 4, a system 400 may also include a digital driving signal generator 404. In an implementation, the values of the impedance/conductance and the mode enter the signal generator 404, if included, which generates the driving signal (digital word) output to the switches T1-T9. In an implementation, the signal generator 404 also reads the duration of the charge phase (Tcharge) and the discharge phase (Tdischarge) as parameters. In one implementation, the signal generator 404 generates a switch configuration for the charge phase based on the impedance/conductance and mode information, waits a programmed time Tcharge, and generates a switch configuration for the discharge phase based on the impedance/conductance and mode information.

The signal generator 404 then waits the programmed time Tdischarge before repeating the cycle.

In one implementation, the durations Tcharge and Tdischarge are fixed, at least temporarily, causing the dc-dc converter 100 to operate at a fixed switching frequency (1/(Tcharge+Tdischarge)) during that time. To change to a different switching frequency, it is sufficient to change the values of Tcharge and/or Tdischarge. Additionally, randomly modulating Tcharge or Tdischarge or both results in a frequency spreading effect. Thus, in one implementation, the digital controller 402 is arranged to determine a switching frequency of the dc-dc converter 100 based on the charging time and/or the discharging time of one or more energy storage capacitors (e.g., C2 and C3).

In an implementation, the impedance/conductance information and/or the mode information changes once per switching cycle (e.g. before starting a charge phase). In other implementations, the impedance/conductance information and the mode information changes at other intervals, for example, oversampling or under-sampling can be used in a system 400. In an implementation, the digital driving signal generator 404 schedules the information update. In another implementation, the signal generator 404 schedules the sampling events of the ADC 408 (clock divider function). In various implementations, the ADC 408 can be triggered to sample twice per switching period (e.g. just before the beginning of the charge and discharge phases, or at the end of the charge and discharge phases). In alternate implementations, oversampling or under-sampling can be used.

Figure 5:
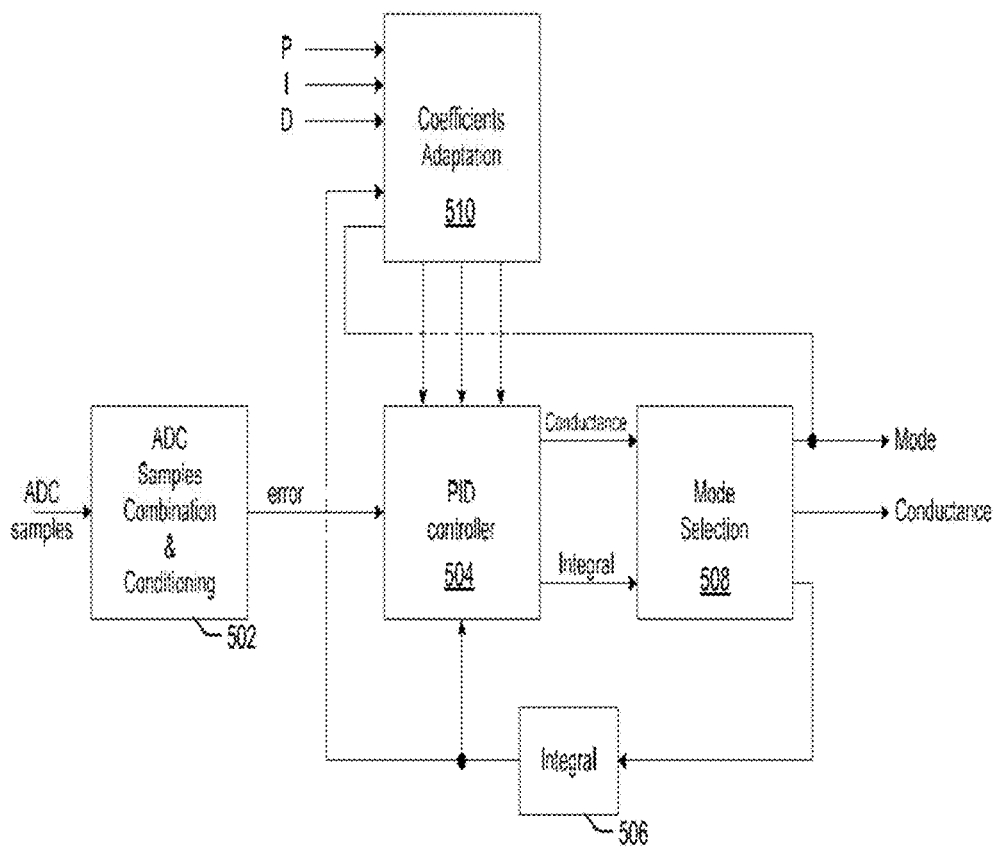
FIG. 5 is a block diagram of a digital controller for a dc-dc converter according to an example implementation.

The block diagram of FIG. 5 shows example functional blocks that may be included in the digital controller 402, according to various implementations. From one or several ADC 408 samples, error information may be generated, as shown at block 502. For example, two or more samples per switching period could be summed to generate an error signal. The error signal indicates how far the output voltage is from the target voltage of the dc-dc converter 100.

In an implementation, the error information is provided to a PID controller 504. In one implementation, a digital controller 402 can be simplified to include a PI controller ("D" coefficient equal to 0). The coefficients P, I, D may be provided by an external block, which adapts the coefficients according to the operating conditions of the dc-dc converter 100 or the system 400. The PID controller 504 receives a set of fixed coefficients P, I, D (typically D=0) and adapts them according to the selected mode (e.g., first, second, or third modes of operation) and the operating conditions. In one implementation, the load current (one operating condition, for example), is read from the integrator 506, and passed to the PID controller 504.

The PID controller 504 updates the value of the conductance based on the information received, and outputs a conductance value to program the switches that are turned "on." The generated conductance value can be applied to all the switches or to a selection (sub-set) of switches (or sub-switches).

If included, a mode selection block 508 determines whether a mode change is desired prior to providing the impedance/conduction information to the switches. In some implementations, a mode change is determined when the requested load current is large (e.g. determine a change from the second mode to the third mode or from the first mode to the second mode) or when the load current is so low that a mode with a better efficiency can be selected (e.g. determine a change from the third mode to the second mode or from the second mode to the first mode). As a result of some mode changes, the impedance/conductance information and the Integral part of the PID information are rescaled to avoid transients in the output voltage.

In an example implementation, the dc-dc converter 100 may be operating in the second mode and the conductance of all switches T1-T9 may be programmed. The small signal transfer function P(s) of the system 400, from the conductance G to the output voltage VO can be calculated according to the equations:

$G=Gdc+g$ ($Gdc$=steady state, $g$=conduction variation)

$Vo=VOUT+vo$ ($VOUT$=steady state, $vo$=voltage variation)

$R=VOUT/Iload$; (Load resistance)

$Gdc=4*Iload/(Vi-2*VOUT)$;

$P(s)=vo(s)/g(s)=K0\times(Vi-2*VOUT)/2/((Gdc+2/R)+s*C)$;

(Transfer Function)

The transfer function P(s) is a first order system, where the corner frequency and the DC gain are changing according to the load current. In various implementations, the DC gain of the system 400 is inversely proportional to the load current and finally to the Gdc. For high frequencies, the integrating behavior is independent from the load current.

Accordingly, for many applications of a system 400, a PI controller is sufficient. A fixed set of coefficients can be used in some implementations, but in other implementations, to improve efficiency, the dependency may be removed from the load current. For example, the "P" coefficient may remain constant while the "I" coefficient is adapted. In one implementation, this may be accomplished by observing the Gdc, which is directly proportional to the load current, which can be approximated by the Integrative component "I" itself. For a large Gdc, a large "I" coefficient can be used. For a small Gdc, a small "I" coefficient may be used. In one implementation, the Gdc (or equivalently the content of the integrator 506 register) can be directly used to scale the "I" coefficient. By use of this coefficient adaptation, as shown at block 510, the digital controller 402 can maintain the open loop transfer function of the whole system 400 constant when the load current changes. In various implementations, the digital controller 402 maintains the open loop transfer function constant based on information received from the feedback loop.

In various implementations, a change of mode can be taken into account, with respect to the coefficients as well. When changing, for instance, from the second mode to the third mode, the dc-dc converter 100 doubles its gain. Therefore, in order to maintain the same dynamic performance, both "P" and "I" coefficients may be halved. Alternately, the output of the PI controller may be halved in the second mode, with the coefficients unchanged.

Figure 8A:
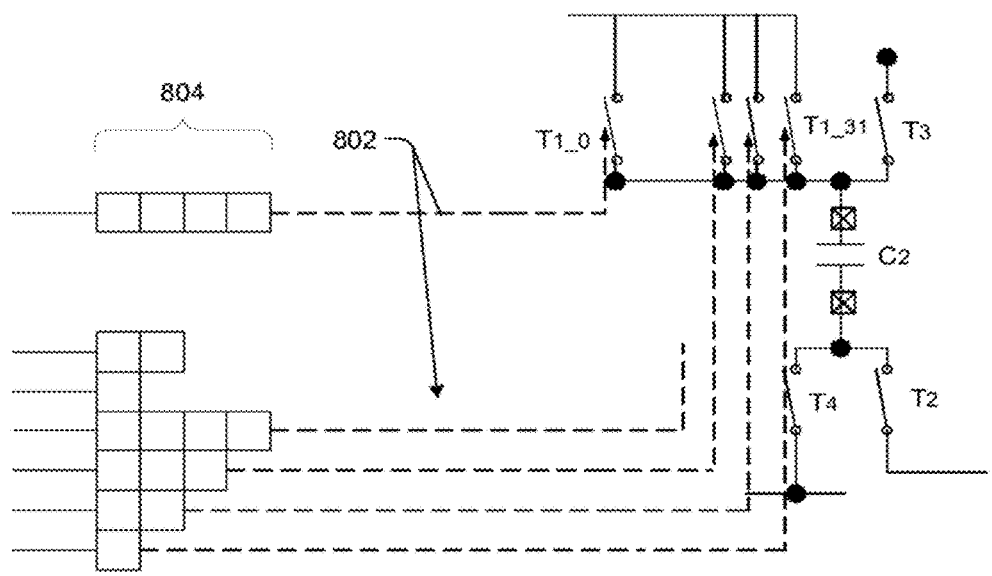
FIG. 8A is a schematic drawing of a portion of a dc-dc converter using slope control techniques according to an implementation.
Figure 8B:
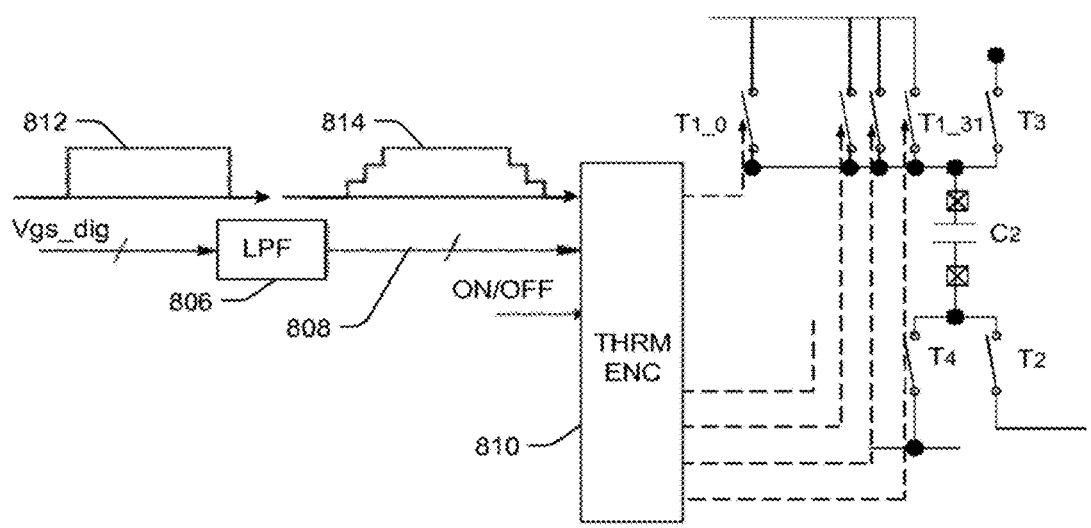
FIG. 8B is a schematic drawing of a portion of a dc-dc converter using slope control techniques according to another implementation.

In an implementation where one or more of the switches T1-T9 are implemented with sets of sub-switches, the digital driving signal generator 404 can drive each individual sub-switch. The impedance/conductance information is translated into a certain number of sub-switches that need to be turned "on." The larger the conductance, the greater the number of sub-switches that need to be turned "on" (this is referred to as a thermometer conversion of the digital conductance representation, and is shown in FIGS. 8A and 8B).

In an implementation, the system 400 may operate using a pulse frequency modulation (pfm) method, at a variable switching frequency. For example, a digital controller 402 may be included in a system 400, where the digital controller is arranged to modulate the switch timing of one or more of the switches T1-T9, based on a load coupled to the output of the dc-dc converter 100. In one instance, the lower the current load of the dc-dc converter 100 becomes, the lower the average switching frequency of the system 400 becomes. A lower average switching frequency generally equates to lower average switching losses, since the switches operate fewer times per time period. In general, the higher the load current is, the shorter the discharge phase will be. Thus, generally, for large loads, the switching frequency will be larger and for small loads the switching frequency will be smaller.

However, in various implementations, a variable switching frequency may be employed that is based on randomly generated values. This technique may be referred to as having a spreading effect on the emission spectrum of the system 400. Accordingly, in an implementation, the digital controller 402 is arranged to regulate the dc-dc converter 100 using pulse frequency modulation according to a randomly varying frequency. The randomly varying frequency may be implemented using one or more of the following techniques:

(1) In one implementation, the charge phase duration of one or more of the energy storage elements C2 and C3 is randomly modulated by adding a random interval to the minimum charge phase duration. For example, in an implementation, the random number generator 602 is arranged to generate a random interval value, and the digital controller 402 is arranged to increase or decrease the charge duration of one or more of the energy storage elements C2 and C3 by the random interval value. (2) In another implementation, the minimum discharge phase duration of one or more of the energy storage elements C2 and C3 is randomly modulated by adding a random interval to the minimum discharge phase duration. For example, in an implementation, the random number generator 602 is arranged to generate a random interval value, and the digital controller is arranged to increase or decrease the discharge duration of one or more of the energy storage elements C2 and C3 by the random interval value. (3) In a further implementation, the conductance of one or more of the switches T1-T9 is randomly selected and adjusted, for example, by the digital controller 402. For example, the amount of charge which is provided from the input source VIN to the output buffer capacitor CL and the load RL can change each switching period, and therefore, the discharge phase can be different each switching period, with the result that the switching period can change each switching cycle. In alternate implementations, one or more of the above techniques may be employed concurrently, or another technique may be used to accomplish the same or similar results. Further, in various implementations, one or more of the above techniques may be applied once each switching period or according to another timing scheme.

Figure 6:
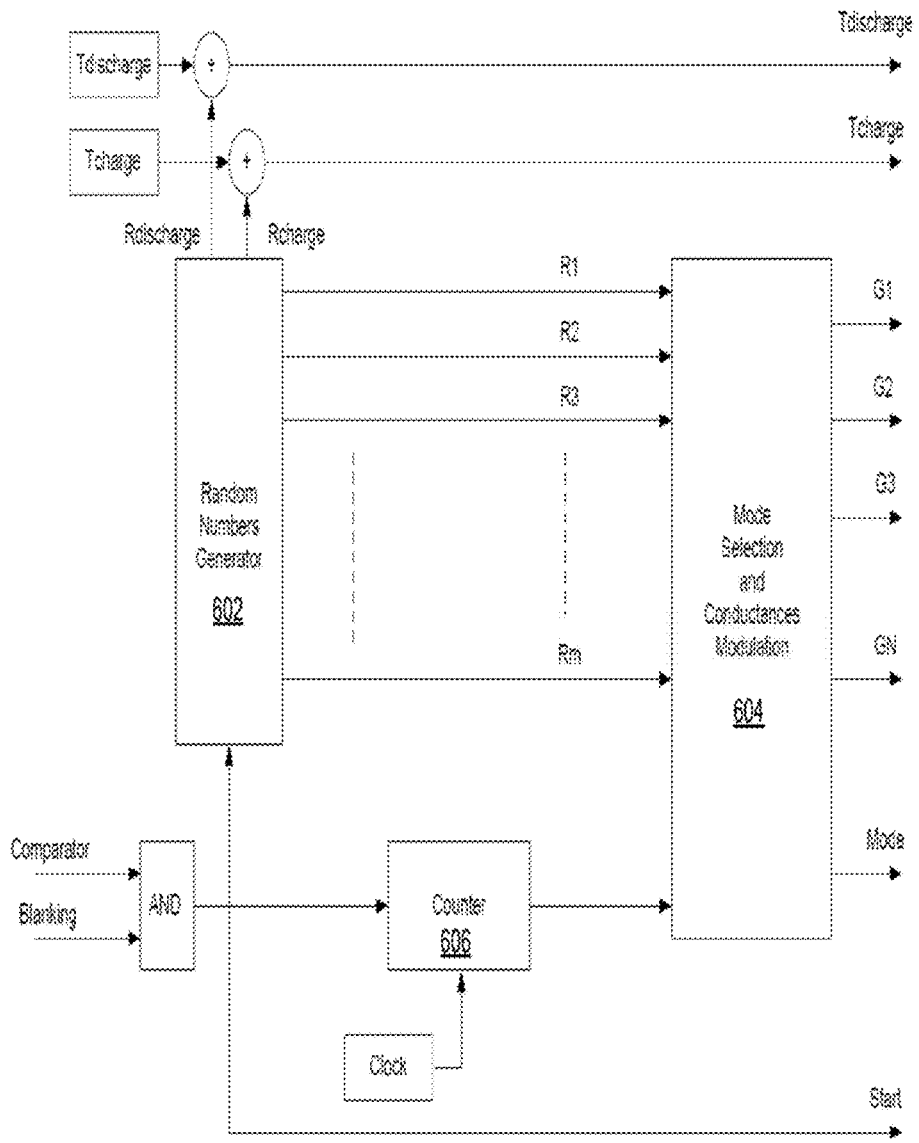
FIG. 6 is a block diagram of a digital controller for a dc-dc converter according to another example implementation.

FIG. 6 is a block diagram of a digital controller for a dc-dc converter 100 according to an example implementation based on randomly varying frequency operation. In an example, once per switching period (e.g. when a comparator triggers), or at another appropriate interval, a set of random numbers is generated by a random number generator 602, for example: Rdischarge, Rcharge, R1, R2, . . . Rm. Rdischarge and Rcharge can be used for implementing options (1) and (2) above. The remaining random numbers (R1, R2, Rm) are used to generate conductance values for the switches T1-T9 comprising the dc-dc converter, as described in option (3) above. Accordingly, in an implementation, the digital controller 402 is arranged to modulate the switch timing of one or more switches T1-T9 based on a random value generated by the random number generator 602.

The digital controller 402 can also implement some additional features. If included, the Mode Selection and Conductance Modulation block 604 can determine, based on the load current, which mode of operation to operate in.

In an implementation, the load current can be monitored by observing the average time of the discharge phase. The digital controller 402 may also include a counter 606 implemented to measure the time between consecutive comparator trigger events. The information may be sent to a low pass filter (not shown), for example, with the output giving an indication of the current capability of the dc-dc converter 100 operating in a certain mode. For instance, when the measured discharge phase gets close to the minimum programmed value Tdischarge, this may indicate that the dc-dc converter 100 is operating close to its maximum current capability for the operating mode, and that a mode change may be recommended (e.g. from the second mode to the third mode, or from the first mode to the second mode). On the other hand, when the measured discharge phase is longer, this may indicate that the operating mode is providing too much current (this condition can cause increased ripple), and a mode change is recommended (e.g. from the third mode to the second mode, or from the second mode to the first mode).

In an implementation where one or more of the switches T1-T9 are implemented as sets of sub-switches, the digital driving signal generator 404 may drive each individual sub-switch. The conductance information output from the Mode Selection and Conductance Modulation block 604 may be translated to an indication (i.e., digital word) that a certain number of sub-switches are to be turned "on." Therefore, the random modulation of the conductance (G1, G2, G3 . . . GN) of a switch T1-T9 that is implemented as a set of sub-switches can be obtained by randomly determining how many sub-switches will be turned on in the next switching period.

In an implementation, an observation of the load current can be also used to shape the random value used to determine the random conductance of a switch T1-T9. For example, if every switch T1-T9 comprises 32 sub-switches, it could be convenient to use a random number within 1-16 when the load current is low or to use a random number within 16-32 when the load current is high.

Example Slope Control

Figure 7A:
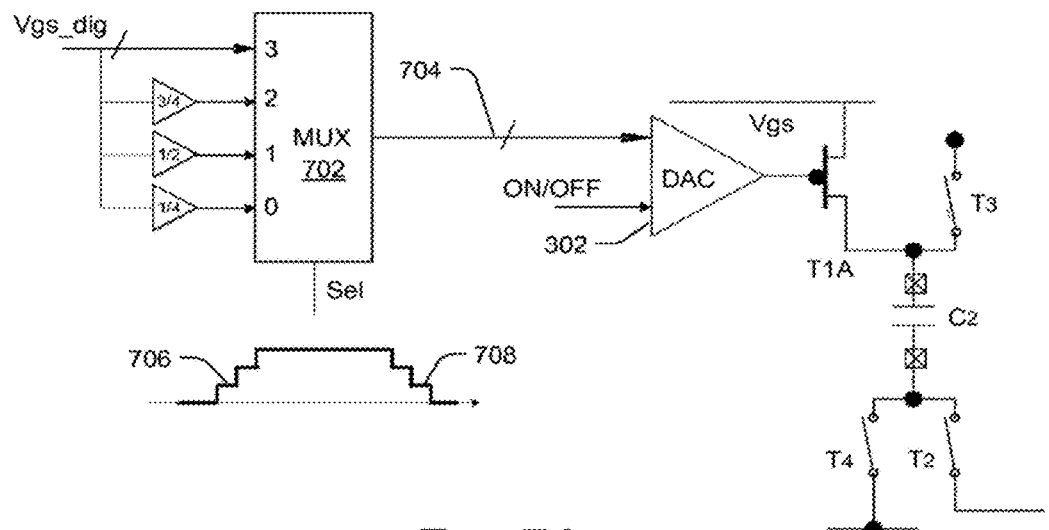
FIG. 7A is a schematic drawing of a portion of a dc-dc converter using a multiplexer and a digital to analog converter according to an implementation.
Figure 7B:
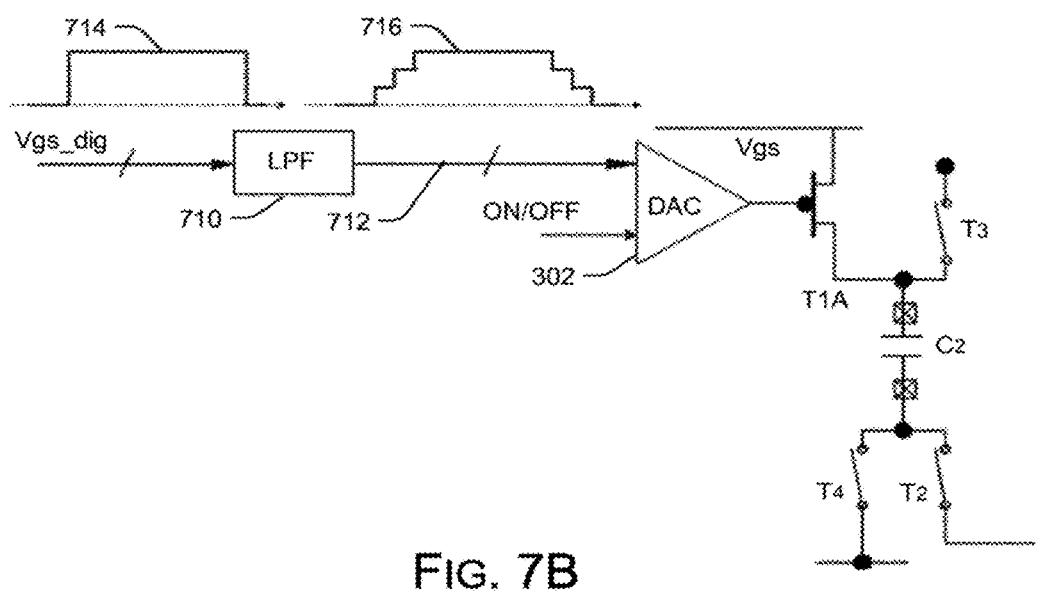
FIG. 7B is a schematic drawing of a portion of a dc-dc converter using a low pass filter and a digital to analog converter according to an implementation.

In various implementations, the slope of the charging and/or discharging phase(s) may be modified, smoothing the transitions from charge to discharge and/or discharge to charge of one or more of the energy storage elements C2 and C3. The amount of current flowing in the switching network 102 or 104 is regulated by selecting the appropriate digital value(s) for the conductance G of one or all the switches T1-T9. In alternate implementations, the digital selection of the conductance G of one or more switches T1-T9 with maximal conductance Gmax can be performed in at least two ways as shown in FIGS. 7A and 7B. In other implementations, other techniques may be used to achieve similar results.

FIG. 7A is a schematic drawing of a portion of a dc-dc converter 100 using a multiplexer (mux) 702 and a digital to analog converter (DAC) 302 according to one implementation. The overdrive voltage (VGS) of the switch T1A is regulated via the DAC 302, as described above with reference to FIG. 3. The DAC 302 is a switch control element, since it can be arranged to output a conductance adjustment signal to a switch T1A, based on a load coupled to the output of the dc-dc converter 100.

Additionally, slope control of the switch timing may be accomplished using the mux 702, where the mux 702 is arranged to control a rate of change of the conductance adjustment signal output to the switch T1A. In an implementation, the mux 702 is arranged to regulate a rate of change of a charge phase and/or a discharge phase of the energy storage element C2 or C3. The mux 702 may be arranged to output a slope control signal 704 to the switch control element (e.g., the DAC 302) according to a clock pulse.

In an implementation, as illustrated in FIG. 7A, the mux 702 receives a signal representing a conductance value (i.e., Vgs_dig, the digital word) and one or more scaled signals representing fractions of the conductance value. The scaled signals are shown in FIG. 7A as ¾, ½, and ¼, and represent those fractions of the conductance value Vgs_dig. In alternate implementations, other fractional portions of the conductance value Vgs_dig (e.g., ⅓, ⅔, etc.) may be alternately or additionally used. The scaled signals may be generated by digital scaling elements (e.g., digital logic, etc.) arranged to receive the signal representing the conductance value (Vgs_dig) and output the one or more scaled signals to the mux 702.

The mux 702 is arranged to output the slope control signal 704, comprising the one or more scaled signals and the conductance signal (Vgs_dig), in either an ascending order or a descending order of magnitude, to the switch control element (i.e., DAC 302). For example, the mux 702 may output the signals in the following order: ¼, ½, ¾, and Vgs_dig. Further, the mux 702 may output the signals in the opposite order as well. In an implementation, the mux 702 may output the signals in ascending order on a rising edge of a switch sequence, as shown at 706 in FIG. 7A, and may output the signals in descending order on a falling edge of a switch sequence, as shown at 708 in FIG. 7A. In this way, the conductance of the switch(es) is increased slowly over the desired time from 0 to the target conductance value (or vice-versa). Consequently, the current on the energy storage capacitors C2 and/or C3 will increase smoothly from 0 to the requested value (or vice-versa) as they charge (and discharge). As discussed above, the techniques described herein may be applied to a single switch or to some or all of the switches T1-T9, as desired.

In an alternate implementation, as illustrated in FIG. 7B, the slope control element comprises a low pass filter 710. The low pass filter 710 is arranged to receive the conductance adjustment signal (Vgs_dig) and output a smoothed slope control signal 712 to the switch control element (i.e., DAC 302). For example, the low pass filter 710 may be arranged to receive the Vgs_dig signal shown at 714, and output the smoothed signal shown at 716. As above, the smoothed signal 716 stages the switch operation, and thus the charging and discharging of the energy storage capacitors C2 and/or C3.

In other implementations, the conductance of one or more of the switches T1-T9 is set by replacing the one or more switches T1-T9 with a set of sub-switches, and selecting sub-sets of the sub-switches to be turned on and/or off. Digital slope control may be employed as shown in FIGS. 8A and 8B.

In the examples shown in FIGS. 8A and 8B, 32 sub-switches (T1_0-T1_31) are used. As described above, less or more sub-switches may also be used. Accordingly, each of the sub-switches of the set of sub-switches has a maximum conductance substantially equivalent to the maximum conductance of the switch(es) replaced by the sub-switches, divided by the number of sub-switches in the set. When a digital controller 402 requests a certain conductance value G, the value is "thermometer coded" and/or binary weighted and mapped to control lines 802 associated with each individual sub-switch T1_0-T1_31. This coding can be referred to as the digital word described above, since it identifies switches, and indicates a switch configuration for the identified switches. Bits of the digital word are associated with control lines and individual sub-switches. For instance, if G=19 in FIG. 8A, when the "switch T1" is to be turned "on," the first 19 lines from the bottom-up are set equal to 1, and the rest of the lines remain equal to 0. Sub-switches (T1_0-T1_31) with a control line 802 equal to 1 may be closed, while sub-switches (T1_0-T1_31) with a control line 802 equal to 0 remain open, for example.

In an implementation, slope control is obtained by a slope control element (e.g., digital controller 402, digital driving signal generator 404, etc.) inserting different delay elements 804 (by one clock cycle, for example) on each control line 802. In the example above, the first line 802 has 1 delay element 804 inserted, the second 2, the third 3, and the fourth 4 delay elements 804. In the example shown in FIG. 8A, at the 5th line, the delay elements 804 are inserted by repeating the scheme 1, 2, 3, 4, 1, 2, 3, 4, . . . and so on.

Based on the inserted delay elements 804, the switch operation of sub-switches T1_0-T1_31 will be delayed different amounts with each switching cycle. In the example where G=19, 5 sub-switches are turned on after 1 cycle, 5 after 2 cycles, 5 after 3 cycles, and finally 4 after 4 cycles. This scheme is generally equivalent to the implementation of FIG. 7A. Over time, the conductance G is smoothly increased and consequently the current flowing in the switch is also smoothly increased.

In one implementation, the G=19 lines are set back to 0 again to turn off the associated switches in a staged scheme as above, including delay elements 804. Again, 5 sub-switches are tuned off after 1 cycle, 5 after 2 cycles, 5 after 3 cycles, and finally 4 after 4 clock cycles.

In an alternate implementation, as shown in FIG. 8B, a low pass filter 806 is used as alternative to the delay elements, and acts as a slope control element. As discussed above with reference to FIG. 7B, the low pass filter 806 receives the conductance adjustment signal (Vgs_dig) and outputs a smoothed slope control signal 808 to a switch control element (e.g., thermal encoder 810). The thermal encoder 810 is arranged to control a switch state of one or more of the set of sub-switches T1_0-T1_31, based on a load coupled to an output of the dc-dc converter 100. For example, the low pass filter may be arranged to receive the Vgs dig signal shown at 812, and output the smoothed signal shown at 814. As above, the smoothed signal 814 stages the switch operation, and thus the charging and discharging of the energy storage capacitors C2 and/or C3. Thus, the low pass filter 806 is arranged to control a rate of change of the switch state of one or more of the set of sub-switches T1_0-T1_31. Additionally, the low pass filter 806 is arranged to regulate a rate of change of the charge phase and/or the discharge phase of the energy storage element C2 or C3.

Figure 9:
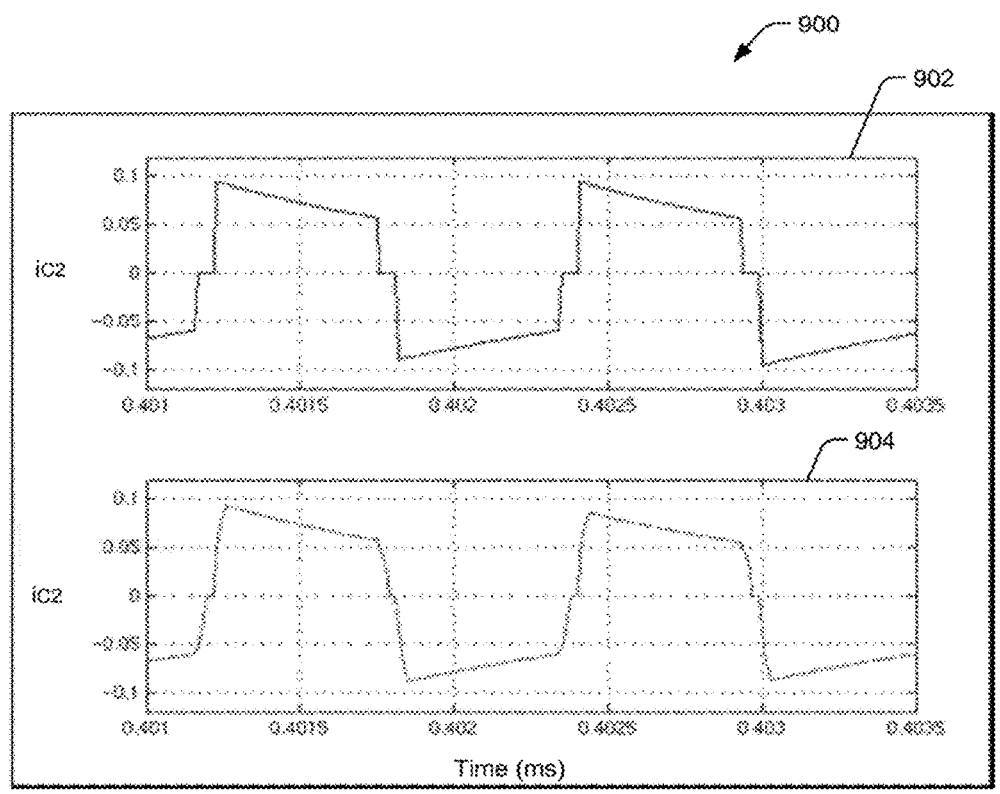
FIG. 9 is an example waveform illustrating slope control techniques according to an implementation.

FIG. 9 is an example of two waveforms illustrating slope control techniques according to an implementation. The waveforms show the current that flows in energy storage element C2 of FIG. 1A during a charge phase (positive) and a discharge phase (negative). The upper diagram 902 represents the scenario where slope control is not used, and the switches T1-T4 are turned on and off immediately. The lower diagram 904 represents the scenario where slope control is used. As can be seen in diagram 904, the transitions from a charging phase to a discharging phase (and vice-versa) are smoother. Thus, slope control techniques modify switching characteristics to reduce instant phase changes of the energy storage element(s) C2 and C3.

Representative Processes

Figure 10A:
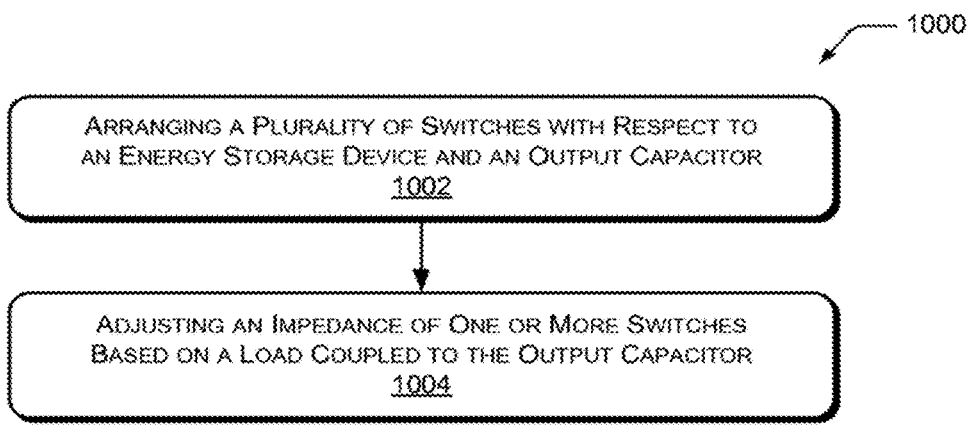
FIG. 10A is a flow diagram illustrating an example process of controlling switching of a dc-dc converter according to an implementation.

FIG. 10A illustrates a representative process 1000 for implementing switching control for a dc-dc converter (such as the dc-dc converter 100). This is also described as regulating the dc-dc converter 100, as the switching control regulates an output of the dc-dc converter. An example process 1000 includes modifying switching characteristics based on a magnitude of the load current. The switching characteristics may be modified to reduce, minimize, or eliminate switching losses in the dc-dc converter. The process 1000 is described with reference to FIGS. 1-9.

At block 1002, the process includes arranging a plurality of switches (such as switches T1-T4) with respect to an energy storage device (such as energy storage device C2) and an output capacitor (such as buffer capacitor CL). In an implementation, the process includes coupling the plurality of switches to the energy storage device such that the energy storage device is in series with the output capacitor when the plurality of switches is in a first switching configuration and such that the energy storage device is in parallel with the output capacitor when the plurality of switches is in a second switching configuration. For example, at least two switches may be coupled to each terminal of the energy storage device. By opening one of the switches at each terminal and closing the other (a first configuration), the energy storage device is in series with the output capacitor. By opening the other of the switches at each terminal and closing the first ones (a second configuration), the energy storage device is in parallel with the output capacitor.

In one implementation, the process may include determining which switches of the plurality of switches are in an open state and which switches of the plurality of switches are in a closed state based on a digital word. A digital word may include, for example, a string of bits arranged to represent switching information such as: switch identification, desired switch impedance, and the like. In an implementation, the process may also include selecting a first sub-set of the plurality of switches to be in an open-state and selecting a second sub-set of the plurality of switches to be in a closed-state, based on the load coupled to the output capacitor.

In various implementations, the process includes selecting one or more of the plurality of switches to be in a fixed state when the load coupled to the output capacitor is reduced. This has an effect of reducing the number of operative switches for reduced loads. Conversely, the process may also include selecting one or more of the plurality of switches to change states with each switching cycle when the load coupled to the output capacitor is increased, thus increasing a number of operative switches for greater loads. Accordingly, individual switches may be "cut in" or "cut out" of operation with each switching cycle, based on changes in the load current.

In an implementation, the process may include selecting a third sub-set of the plurality of switches to be in a fixed state for a preset number of switching cycles, thus maintaining a number of switches for a preset number of switching cycles.

In one implementation, the process 1100 includes selecting one or more of the plurality of switches for impedance adjustment based on a digital word. In various implementations, a single digital word or multiple digital words may be employed. Additionally, separate digital words may be associated to individual switches.

At block 1004, the process includes adjusting an impedance of one or more of the plurality of switches based on a load coupled to the output capacitor. In one implementation, adjusting the impedance of a switch includes selecting a gate-source voltage for a MOS device. In another implementation, adjusting an impedance includes selecting a sub-set of sub-switches to be on or off, where the sub-switches in total represent a single switch or a set of switches. Thus, the impedance of the total set of switches may be substantially equal to the impedance of the switch or switches being represented by the set.

Figure 10B:
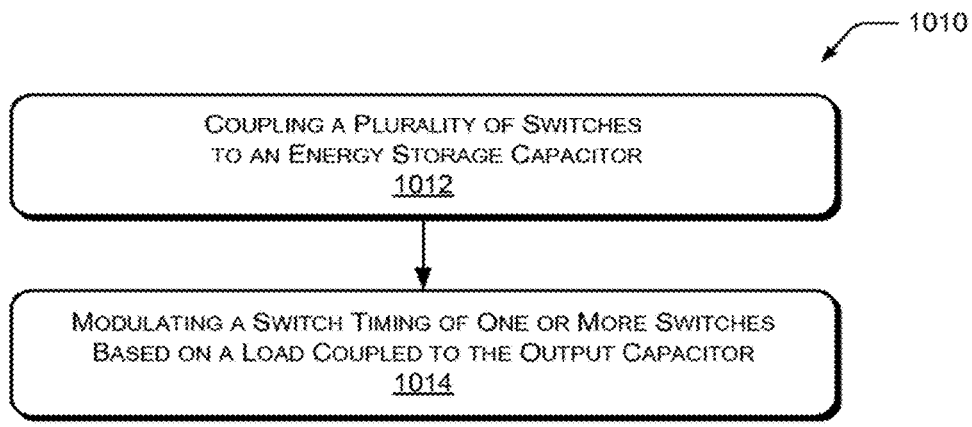
FIG. 10B is a flow diagram illustrating an example process of controlling switching of a dc-dc converter according to another implementation.

FIG. 10B illustrates another representative process 1010 for implementing switching control for a dc-dc converter (such as the dc-dc converter 100). This is also described as regulating the dc-dc converter 100, as the switching control regulates an output of the dc-dc converter. An example process 1010 includes modifying switching characteristics based on a magnitude of the load current. The switching characteristics may be modified to reduce, minimize, or eliminate switching losses in the dc-dc converter. The process 1010 is described with reference to FIGS. 1-9.

At block 1012, the process includes coupling a plurality of switches (such as some of all of switches T1-T9) to an energy storage capacitor (such as one or more of energy storage elements C2 and C3) of a dc-dc converter (such as dc-dc converter 100). The switches are arranged to control charging and discharging of the energy storage capacitor. In one implementation, one or more of the switches is comprised of a multiplicity of sub-switches. In a further implementation, the process includes adjusting the conductance of the one or more switch(es). This may be accomplished by selecting a random number of the sub-switches (that comprise the switch(es)) to be in a closed state.

In another implementation, the process includes selecting a random number of the sub-switches within a preset range based on the load coupled to the output of the dc-dc converter. For example, if one of the switches T1-T9 comprises 32 sub-switches, a random number within 1-16 can be selected when the load current is low or a random number within 16-32 can be selected when the load current is high.

In an implementation, the process includes adjusting a charge duration of the energy storage capacitor based on a random interval value. This may include lengthening or shortening the charge duration by a random interval value. In an alternate implementation, the process includes adjusting a discharge duration of the energy storage capacitor based on a random interval value. Again, this may include lengthening or shortening the discharge duration by a random interval value.

In one implementation, the process includes measuring an average discharge duration of the energy storage capacitor, and filtering the measurement to determine a load current of the dc-dc converter. For example, a counter may be used to measure the average discharge duration, and a digital controller may adjust one or more of the switches when a count at the counter meets a preset threshold. Accordingly, the preset threshold may represent a load current level.

At block 1014, the process includes modulating the switch timing of one or more of the plurality of switches based a load coupled to an output of the dc-dc converter.

In one implementation, the process includes regulating the dc-dc converter using a pulse frequency modulation (PFM) technique according to a randomly varying frequency. For example, including varying the modulation frequency by adding a random value to the charge duration and/or the discharge duration of the energy storage capacitor. In another implementation, the process includes adjusting the conductance of one or more of the plurality of switches based on a random value. This may include adding to the conductance or subtracting from the conductance the value of a random variable.

The order in which the processes 1000 and 1010 are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented in any suitable hardware, software, firmware, or a combination thereof, without departing from the scope of the subject matter described herein.

In alternate implementations, other techniques may be included in the processes 1000 and 1010 in various combinations, and remain within the scope of the disclosure.

Figure 11:
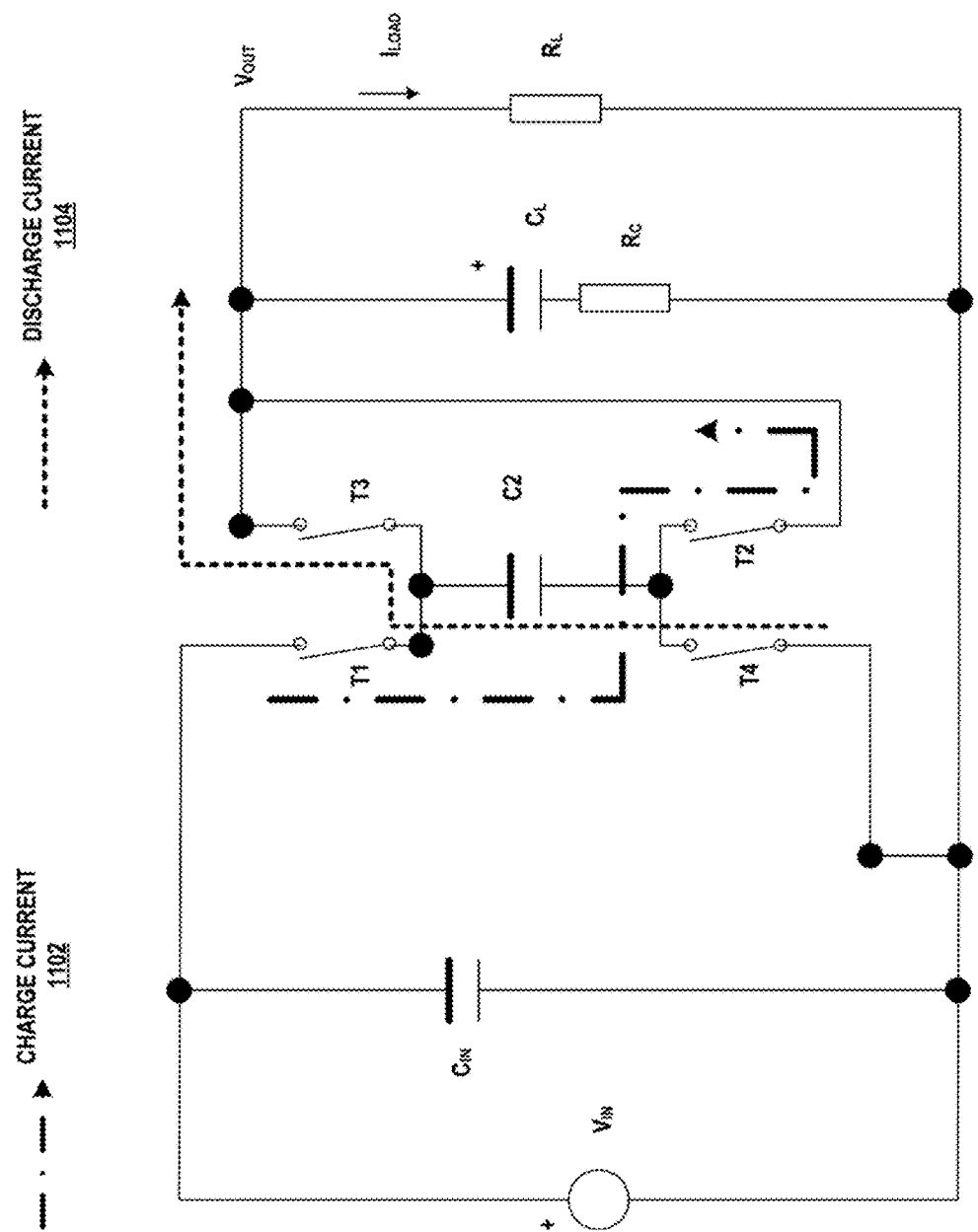
FIG. 11 is schematic drawing of an example switched capacitor DC-DC converter showing the path of current through the energy storage element during charge phase and discharge phase.

FIG. 11. is schematic drawing of an example switched capacitor DC-DC converter showing the path of current through the energy storage element during charge phase and discharge phase. The network of switches and other components of FIG. 11 are the same as described above in relation to FIG. 1A. The example of FIG. 11 depicts an input capacitor Cin connected across the input source Vin.

As a brief overview, during charge phase, switch T1 connects the first terminal of energy storage element C2 to input source Vin, while switch T2 connects the second terminal of C2 to the positive terminal of buffer capacitor $C_L$. Energy storage element C2 is a capacitor in the examples of FIGS. 1A and 11. During the charge phase, charge current 1102 passes through switch T1, from the first terminal of C2, through C2 and out the second terminal of C2. Charge current 1102 passes through switch T2 to the positive terminal of buffer capacitor $C_L$.

During the discharge phase, switches T3 and T4 may close and the energy stored in energy storage element C2 is transferred to buffer capacitor $C_L$. During the discharge phase, discharge current 1104 passes through switch T4, from the second terminal of C2, through C2 and out the first terminal of C2. Charge current 1104 passes through switch T3 to the positive terminal of buffer capacitor $C_L$. FIG. 11 also depicts the load current $I_{LOAD}$ flowing through the load $R_L$.

In more detail, a switched capacitor DC to DC converter (SC-DCDC) converts the input voltage (Vin) into the output voltage (Vout) and supplies a certain output load current (for example to a microcontroller or other circuit). Vin can be higher than Vout (a step-down configuration), equal to Vout or smaller than Vout (a step-up configuration). The below example operation will focus on a step-down configuration of an SC-DCDC: Vin>Vout. Some aspects of the below example were also described above in relation to FIGS. 1A-2C. In this disclosure, an SC-DCDC may also be referred to as a DC-DC converter.

In SC-DCDC the input voltage, Vin, is connected to a switching network, which consists of a certain number of switches and capacitors connected. The capacitors, called flying capacitors, as described above, are used to transfer the energy from input to the output of the SC-DCDC. In the example of FIG. 11, the switching network includes switches T1-T4, and the flying capacitor is named C2. Positive terminal, or the first terminal of C2 is connected via T1 switch to the input voltage source Vin or via T3 switch to the output buffer capacitor $C_L$ and the output load $R_L$. The negative terminal, or second terminal of C2 is connected to the ground via switch T4 or via switch T2 to the output buffer capacitor $C_L$ and the output load $R_L$. Output buffer capacitor $C_L$ is connected to the output of SC-DCDC for storing the energy used during fast changes of the output load, such as load jumps. An example load jump may include a 200 mA change in current that occurs in 10 ns. The load may change quickly, for example when a microcontroller switches from a sleep (idle) state to an operational state.

The number of switches and flying capacitors, as well as their configuration, depends on the ratio between Vin and Vout to maximize the efficiency of the converter, as described above. The example of FIG. 11 is an SC-DCDC converter with ratio ½ (Vin>2×Vout). But the solution also can be used in SC-DCDC converters operated in different modes (step-up/down) and with different ratios.

The regulation of output voltage Vout and energy transfer is achieved by alternating two phases with different configuration of switches. In the charge phase T1 and T2 are closed, T3 and T4 are open. In this way flying capacitor C2 is connected in series with output buffer capacitor $C_L$. Energy flows from source Vin to the output may charge C2. During discharge phase T3 and T4 are closed, T1 and T2 are open. Flying capacitor C2 is connected in parallel to the output buffer capacitor $C_L$ and energy stored in C2 during charge phase is transferred to the output buffer capacitor $C_L$. Note that the energy transfer from C2 to $C_L$ is only possible when Vin>2× Vout.

Figure 12B:
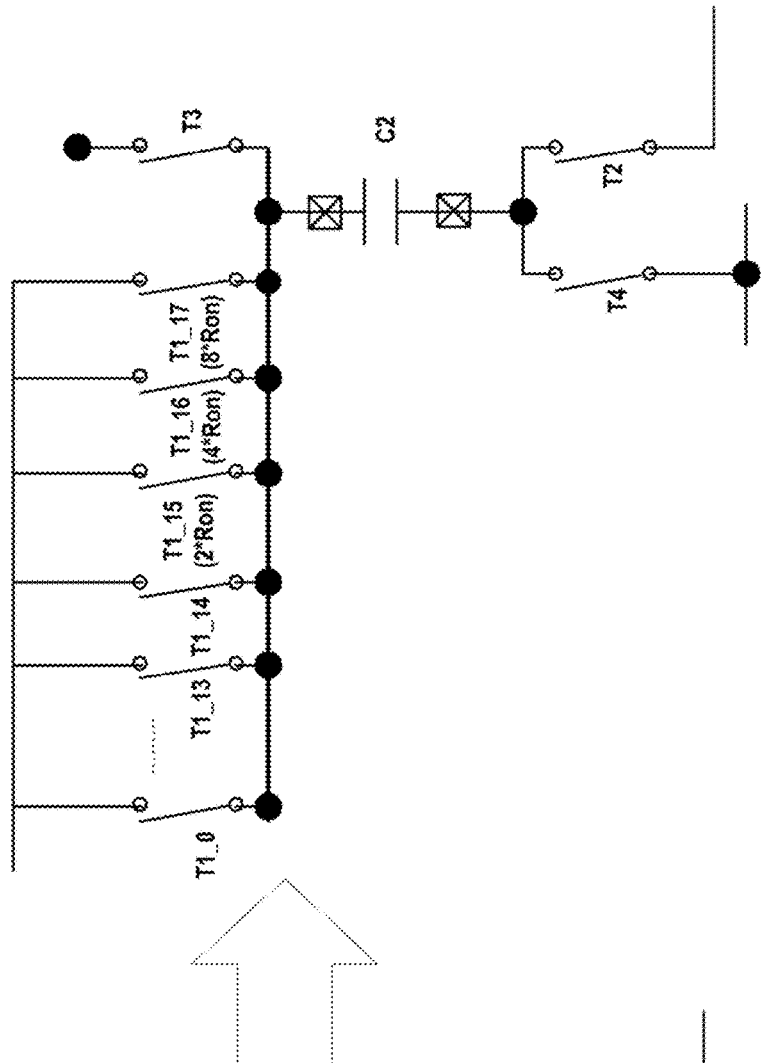
FIG. 12B is a schematic drawing illustrating of a portion of a switched capacitor DC-DC converter that includes an example implementation of sub-switches connected to the energy storage element.
Figure 12A:
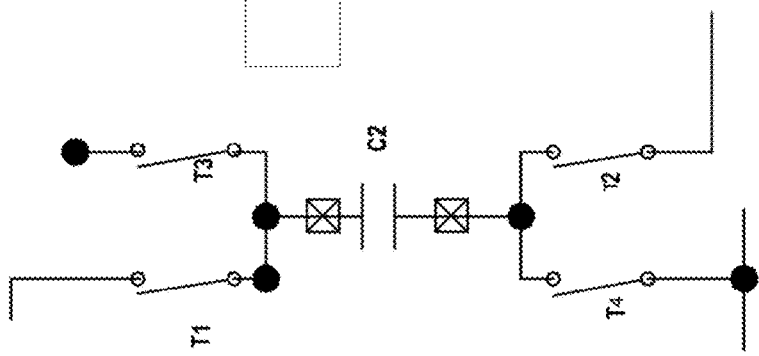
FIG. 12A is a schematic drawing illustrating of a portion of a switched capacitor DC-DC converter that includes just the switch network and energy storage element.

FIG. 12A is a schematic drawing illustrating of a portion of a switched capacitor DC-DC converter that includes just the switch network T1-T4 and energy storage element C2. In this disclosure, energy storage element C2 and flying capacitor C2 may be used interchangeably. The components and connections in FIG. 12A correspond to the components and connections described above in relation to FIGS. 1A and 11. In some examples one or more single switches, such as switch T1, may be replaced by a plurality of sub-switches, similar to the plurality of sub-switches described above in relation to FIG. 3B.

FIG. 12B is a schematic drawing illustrating of a portion of a switched capacitor DC-DC converter that includes an example implementation of sub-switches connected to the energy storage element C2. As with the example of FIG. 3B, each of the four switches T1-T4 of FIG. 12B may be implemented with a plurality of sub-switches. For clarity, only switch T1 is shown as a plurality of sub-switches in FIG. 12B. In other words, though not shown in FIGS. 11-12B, switches T2 and T4 may comprise a plurality of sub-switches. The sub-switches of switches T2 and T4 may be described as a plurality of switches connected to the negative terminal energy storage element C2.

As described above, in some examples fewer switches may be used as the load current, such as $I_{LOAD}$, decreases. The decision which impedance is needed may be managed by digital logic depending on the output load, such as digital controller 402 described in relation to system 400. The higher the load current, the more sub-switches may be operated, as described above. The conductance of each of the sub-switches may be adjustable. The digital controller may be configured to independently control the conductance of each one plurality of switches to sub-switches. The digital controller may switch an electrical connection between the energy storage element C2 and the output load $R_L$ of the DC-DC converter between a parallel electrical connection and a series electrical connection by modulation of a switch timing of the plurality of sub-switches. In some examples, the digital controller may be configured to independently control the conductance of each one plurality of sub-switches, or switches, based on a magnitude of load current, such as $I_{LOAD}$, to the output load $R_L$.

In the example where each sub-switch of the plurality of sub-switches has approximately the same Ron, when the load current is very low, such as during a sleep state of the load, such as a microcontroller or other circuit, the digital controller may include "skip pulses" to efficiently deliver very low current. A skip pulse is the example in which no sub-switches are closed during a given switching cycle. Implementing skip pulses may increase the voltage ripple on the output voltage. In this disclosure, "approximately the same," "approximately equal," "substantially the same," and "substantially equal" mean the values are equal within manufacturing and measurement tolerances.

One possible technique to reduce the need for skip pulses is to increase the number of sub-switches. A greater number of sub-switches may allow the circuit to have a finer control over the magnitude of the output current delivered to the load. However, a large number of switches may have the disadvantage of requiring increased number of logic control lines, increase complexity and may increase the amount of space required on an integrated circuit (IC). As described above in relation to FIG. 3B, the sum of the impedances for all the sub-switches approximately equals the total impedance for a single switch. For example, the Ron for a single switch T1 may be approximately the same as total impedance for all the sub-switches. Therefore, the IC area used by just the sub-switches, not including the logic control lines, may be approximately the same as the area used by a single switch.

The example of FIG. 12B illustrates a different technique to reduce the need for skip pulses. The example of FIG. 12B illustrates fourteen sub-switches, T1_0-T1_14, which all have approximately the same Ron as each other. In other words, the Ron of sub-switch T1_3 approximately equals the Ron of sub-switch T1_5. The sub-switches of switch T1 may further include three additional sub-switches, each with an Ron that is a multiple of the remaining sub-switches. For example, where Ron_T1 is the Ron for sub-switches T1_0-T1_14, then T1_15 may have an Ron of 2*Ron_T1, T1_16 may have an Ron of 4*Ron_T1, T1_17 may have an Ron of 8*Ron_T1. As described above, the number of switches and distribution of on resistance is just one example of an implementation of the technique of this disclosure. Other examples may have more or fewer switches and the higher Ron switches may be different multiples, such as 3*Ron, 6*Ron, 0.5*Ron and so on. In this disclosure, the terms fractional weighting and multiple weighting may be used interchangeably. Also, for clarity, only the sub-switches for switch T1 are shown in example 12B. In other examples, any of the switches T1-T4 may include a plurality of sub-switches as shown for switch T1. In some examples, the configuration and number of sub-switches for one switch, such as switch T1 may be different than the configuration and number of sub-switches for another switch, such as switch T4.

In operation, the example of FIG. 12B may deliver a high output load current via the low impedance sub-switches T1_0-T1_14. A fine low ripple regulation of output voltage is achieved via control of high impedance sub-switches, T1_15-T1_17. When the output load is very small, one low impedance sub-switch may deliver more current than needed. Therefore, the circuit may operate the high impedance sub-switches T1_15-T1₁₇ instead of performing a "skip-pulse." In this manner, the technique of this disclosure illustrated by the example of FIG. 12B may operate over a wide load range with reduced output voltage ripple when compared to other techniques.

In more detail, the low impedance sub-switches T1_0-T1_14 may be desirable for high current capability of the SC-DCDC. Sub-switches T1_0-T1_14 may be described as a first plurality of switches connected to the positive terminal of energy storage element C2. As one example, maximum load current can be calculated as:

$$I_{max}=(V_{in}-2\times V_{out})/(2\times(2\times R_{on}))$$

For example, Vin=3.3V, Vout=1.5V (Vin>2× Vout), Ron=0.5Ω (sum of parallel connection of all sub-switches) the maximum current delivered by SC-DCDC is 150 mA. But optimization of sub-switches only for high current in the hundreds of mA using only low impedance sub-switches may decreases the precision of the output voltage control at low load currents, as described above. For example, one sub-switch may have $$R_{on}=(0.5\Omega-R_{bond})*16 \text{ sub-switches}=(0.5-0.3)*16=3.2\Omega$$

where Rbond may be bond wire resistance plus parasitics, and in some examples, may be on the order of Rbond=0.3Ω. In this example, the minimum current (Imin) delivered with only one sub-switch closed is:

$$I\_min=(3.3V-2\times1.5V)/(2\times2\times(3.2\Omega+R_{bond}))=0.3/12.8=0.023 \text{ A}$$

If load current $I_{LOAD}$ is less than Imin, then the SC-DCDC may periodically perform a skip pulse which may result in an increased output voltage ripple, as described above. In some examples, the voltage ripple in Vout may double at low current. Depending on the load current skip pulse can continue for few switching cycles.

The technique depicted by the example of FIG. 12B may include sub-switches with higher on impedance Ron. In the example of FIG. 12B, sub-switches T1_15-T1_17 are weighted as fractional increases over the impedance of the low impedance sub-switches T1_0-T1_14. In other words, one out of 16 sub-switches with equal Ron of "R" is replaced with three sub-switches: 2R (two times higher Ron), 4R, and 8R. In this way, the additional switches avoid an increase in IC area consumed for switch T1. In other examples, adding additional high impedance sub-switches may result in even more resolution, such as by adding further switches with 16R, 32R and so on. In the example of FIG. 12B, the high impedance switches are weighted in a fractional way, but in other examples the additional high impedance switches may can be weighted in binary, logarithmic or some other way. In other words, in the example of FIG. 12B one switch (e.g. T1) may consist of sub-switches: 15×R (T1_0-T1_14), 1×2R (T1_15), 1×4R(T1_16) and 1×8R(T1_17). Sub-switches T1_15-T1_17 may be described as another plurality of switches connected to the positive terminal of energy storage element C2.

In this way, when output load $I_{LOAD}$ is very low, only high Ron switches T1_15-T1_17 may be operated. Continuing the example from above, the SC-DCDC circuit may only perform a skip pulse when the 8R switch T1_17 results in a current greater than needed for the load. With the technique of FIG. 12B, the minimum load current delivered without skip pulses is about eight times lower than when using sixteen sub-switches with equal Ron, as shown by the below equations:

$$R_{on}\_8R=R_{on}*8=(0.5\Omega-R_{bond})*16*8\Omega=(0.5\Omega-0.3\Omega)*16*8\Omega=3.2*8\Omega=25.6\Omega$$

Therefore, the minimum current delivered with only the 8R sub-switch closed is:

$$I\_min=(3.3V-2\times1.5V)/(2\times2\times(25.6\Omega+R_{bond}))=0.3V/103.6\Omega=0.0028 \text{ A}$$

Also, the high current capability may only be minimally or not affected because the parallel connection of 2R, 4R and 8R gives almost the same Ron as one low impedance switch.

In another example, the sub-switches may be implemented with an additional sub-switch that has an on-resistance of 8Ron, such as:

15×1 Ron
1×2 Ron
1×4 Ron
2×8 Ron

This implementation may result in the same impedance as the example above. Other examples may include other configurations of fractional switches. In other examples, as described above, the switches may be related ways other than fractional or multiple, including logarithmic.

One example implementation may use a digital controller, such as a PI controller described above in relation to system 400. The digital controller may calculate the conductance value to achieve the desired load current $I_L$. The conductance value represents how many sub-switches in each switch, e.g. T1, need to be closed to supply requested output load. In one example, when conductance is 4, this means that one sub-switch need to be closed in each of four switches T1-T4 during the next switching cycle. In some examples conductance value may be updated every switching cycle. In the example of FIG. 12B, for the digital controller calculations it to weight switches by their conductance:

8R sub-switch T1_17 has conductance 1;
4R sub-switch T1_16 has conductance-2;
2R sub-switch T1_15 has conductance-4;
Each R sub-switch T1_0-T1_14 has conductance-8;

The maximum conductance of proposed system is:

$$4*(15*8+1*4+1*2+1*1)=508.$$

The conductance value is multiplied by 4 because there are 4 switches (T1, T2, T3 and T4) in the switching network of FIG. 12B. The output of the digital controller, such as digital controller 402 depicted in FIG. 4, may vary from 0 to 508 depending on the load current. Calculated conductance value may need to be divided into conductance per switch values, then distributed among the sub-switches that comprise each switch. To achieve the best ripple performance charge switches (T1 & T2) and discharge switches (T3 & T4) should be balanced. Also, sub-switches with higher Ron should have higher priority for conductance distribution for minimizing the effect from very small cycle deviation of conductance at constant load current. In some examples, conductance can vary by 1-2 from one to another switching cycle.

One example algorithm for a digital controller to calculate conductance per switch and distribute among sub-switches may be done as shown below:

Conductance_1=floor(Conductance/4)+(mod(Conductance,4)>=2);

Conductance_3=floor(Conductance/4)+(mod(Conductance,4)>=3);

Conductance_4=floor(Conductance/4);

Conductance_2=floor(Conductance/4)+(mod(Conductance,4)>=1);

% switch 1 n8R_1=floor(mod(Conductance_1,2));

n4R_1=floor(mod(Conductance_1,4)/2);

n2R_1=floor(mod(Conductance_1,8)/4);

n1R_1=floor(Conductance_1/8);

% switch 3 n8R_3=floor(mod(Conductance_3,2));

n4R_3=floor(mod(Conductance_3,4)/2);

n2R_3=floor(mod(Conductance_3,8)/4);

n1R_3=floor(Conductance_3/8);

% switch 4 n8R_4=floor(mod(Conductance_4,2));

n4R_4=floor(mod(Conductance_4,4)/2);

n2R_4=floor(mod(Conductance_4,8)/4);

n1R_4=floor(Conductance_4/8);

% switch 2 n8R_2=floor(mod(Conductance_2,2));

n4R_2=floor(mod(Conductance_2,4)/2);

n2R_2=floor(mod(Conductance_2,8)/4);

n1R_2=floor(Conductance_2/8 where nxR_y is the number of sub-switches associated to switch #y with impedance xR. The example algorithm using the fractional high impedance switches T1_15-T1_17 may result in balancing of charge\discharge phases of one conductance value with priority set to the charge phase.

In contrast, to obtain the same performance using sub-switches with an equal Ron may require that each switch T1-T4 be implemented with 127 sub-switches with equal impedance (a total of 4×127 sub-switches). An implementation with 127 sub-switches may have disadvantages when compared to the techniques of FIG. 12B, including requiring more routing from the digital to the analog sub-macros and more IC area required because of the large number of level-shifters needed to translate control signals from the core domain of the digital part to the medium/high voltage domain of the switches.

Figure 13:
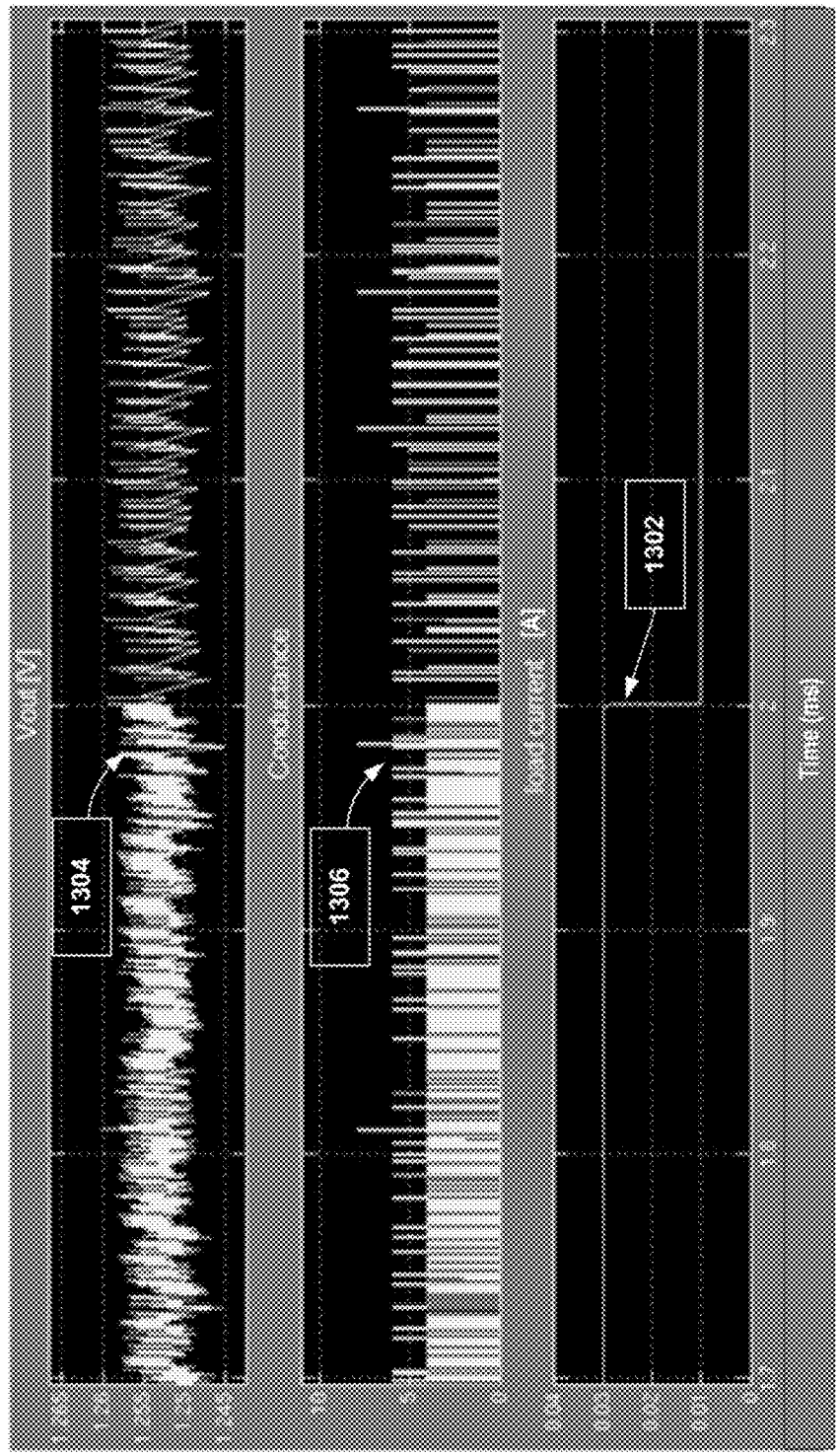
FIG. 13 is a time graph illustrating the result of output voltage ripple in an SC-DCDC converter where each switch in the switching network consists of sixteen equal sub-switches.

FIG. 13 is a time graph illustrating the result of output voltage ripple in an SC-DCDC converter where each switch in the switching network consists of sixteen equal sub-switches. FIG. 13 illustrates the voltage ripple 1304 on the output voltage, such as Vout depicted in FIG. 11, the calculated conductance 1306, and a change in the load current 1302. The load current of FIGS. 13-14 and 17-18 may correspond to load current $I_{LOAD}$ depicted in FIG. 11. Steady state operation in FIGS. 13 and 14 is shown at 3.3V input voltage Vin with load current $I_{LOAD}$ of 30 mA with a load jump to 10 mA (1302) performed in 10 ns and simulated in MATLAB.

Figure 14:
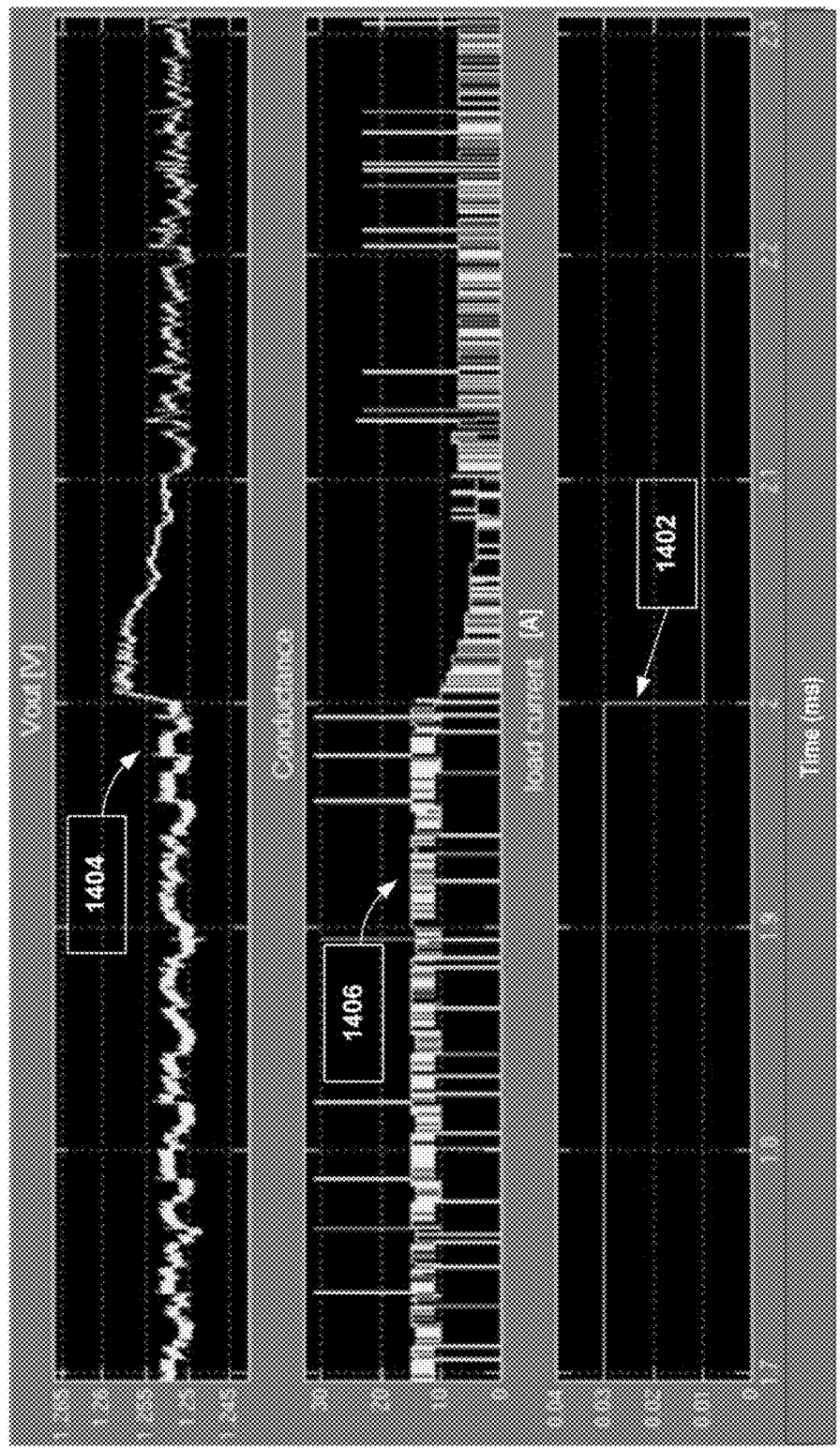
FIG. 14 is a time graph illustrating the result of output voltage ripple with fractional switches, in which each switch consists of 15 sub-switches with Ron of R, one with 2R, one with 4R and one with 8R.

FIG. 14 is a time graph illustrating the result of output voltage ripple with fractional switches, in which each switch consists of 15 sub-switches with Ron of R, one with 2R, one with 4R and one with 8R. The time graph of FIG. 14 corresponds to the circuit illustrated in the example of FIG. 12B. FIG. 14 illustrates voltage ripple 1404 on the output voltage, such as Vout depicted in FIG. 11, the calculated conductance 1406, and a change in the load current 1402.

Comparing the voltage ripple 1404 of FIG. 14 to the voltage ripple 1304 of FIG. 13, shows a lower voltage ripple, especially at the low load current of 10 mA. A response to the load jump can be seen in FIG. 14, which includes the fractional switches as described in relation to FIG. 12B. However, the overshoot is of FIG. 14 is smaller than the ripple seen in FIG. 13. In other words, the MATLAB simulation illustrates an advantage of improved voltage ripple performance for a circuit that includes a set of high impedance sub-switches along with low impedance sub-switches, according to one or more techniques of this disclosure.

Figure 15:
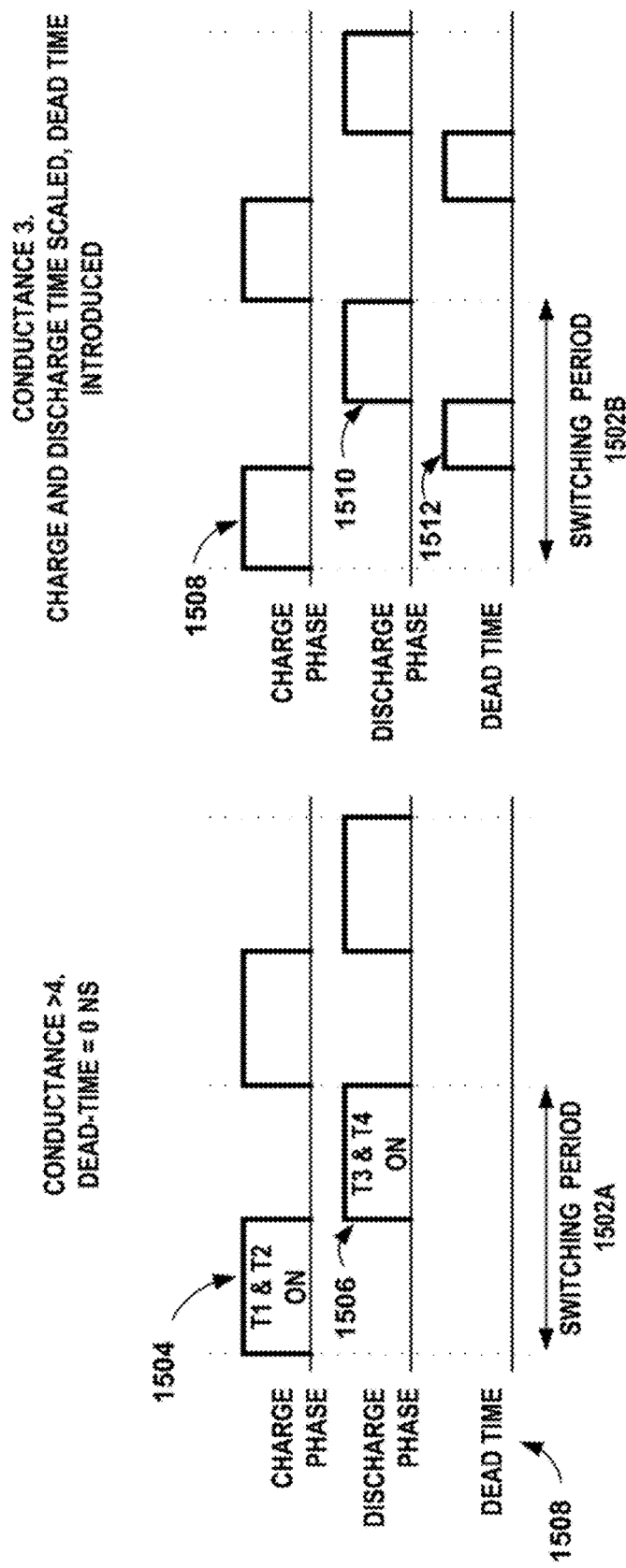
FIGS. 15A and 15B are timing graphs that illustrate a technique of switch dead-time, in which no switch of the switching network conducts for a portion of a switching cycle.

FIGS. 15A and 15B are timing graphs that illustrate a technique of switch dead-time, in which no switch of the switching network conducts for a portion of a switching cycle. Examples of a switching network for an SC-DCDC were described above, such as switching network 102 and 104 described in relation to FIGS. 1A and 1B, and switches T1-T4 described in relation to FIG. 11.

FIG. 15A is a timing graph that illustrates a switching period, which includes a charge phase and discharge phase. As described above in relation to system 400 and FIGS. 7A-8B, a switching period may include a charging phase 1504 and a discharge phase 1506. A digital controller for an SC-DCDC circuit may set the charge phase 1504 and the discharge phase 1506 to have approximately equal duration. An equal duration for the charge phase 1504 and the discharge phase 1506 may be desirable to reduce voltage ripple. As described above in relation to FIGS. 11-12B, during the charge phase 1504 of flying capacitor C2, switches T1 and T2 may be ON while switches T3 and T4 may be OFF. During the discharge phase 1506 of flying capacitor C2, switches T1 and T2 may be OFF while switches T3 and T4 may be ON. In other examples, other switch configurations may be used, as described above in relation to FIGS. 2A-2C.

As described above, in some examples where the load, $R_L$, may need a high input voltage Vin and low output load current $I_{LOAD}$, only a few sub-switches may be needed to be operated. In some examples, the request of digital control during regulation to increase or decrease the number of closed sub-switches by 1 may provoke an increased ripple on the output voltage. In these examples, a finer degree of control when switching between levels of output current $I_{LOAD}$ may be desirable. Also, as described above output voltage ripple may be increased by the "skip pulses," which will happen when output load decreases even more, such as the load switching to sleep mode of a system where the SC-DCDC converter is integrated.

FIG. 15B is a timing graph that illustrates a switching period that includes a dead time phase in which no switch of the switching network in an SC-DCDC converter conducts. The example of FIG. 15B illustrates the dead time phase 1512 of switching period 1502B, that is inserted between a charge phase 1508 and a discharge phase 1510. As with the example of FIG. 15A in which the duration of the dead time phase is zero, e.g. zero ns, the duration of the charge phase 1508 may be approximately the same as the duration of the discharge phase 1510.

In some examples, the duration of switching period 1508, with a zero duration dead time phase, may be approximately equal to the duration of a second switching period, such as switching period 1502B, that includes a non-zero duration dead-time phase. The SC-DCDC may operate at a fixed switching frequency. In other examples, the SC-DCDC may randomly modulate the switching frequency to achieve a frequency spreading effect, such as described above in relation to FIG. 4. During each switching period, a digital controller, such as digital controller 402, may calculate the duration of the dead-time phase is based on a magnitude of load current $I_{LOAD}$ to the output load $R_L$. As described above, the digital controller may calculate the required conductance and determine the duration of the dead-time phase.

The techniques depicted in FIG. 15B may be combined with the high and low impedance switch techniques described above in relation to FIGS. 12B-14, or with the other switch impedance control techniques of this disclosure. In one example, precise regulation of output voltage Vout at low load currents $I_{LOAD}$ may be achieved by modulating the charge and discharge time when switch impedance modulation is not effective to reduce output current. To keep the switching frequency of SC-DCDC converter constant, the dead time phase may be introduced in-between the charge phase 1508 and discharge phases 1510, as shown in FIG. 15B 2. During the dead-time phase 1512, none of the switches conduct. As with the other techniques of this disclosure, modulation of the duration of the charge phase (charge time) and duration of the discharge phase (discharge time) may be determined by digital logic based on the output load. For example, the lower the load, the smaller charge time and discharge time and longer the duration of the dead time phase.

The dead-time techniques of this disclosure described in the example of FIG. 15B may have several advantages. Some advantages may include, implementing the dead-time techniques to an existing SC-DCDC circuit may not require analog changes of the circuit, only change in digital logic control. Thus, the maximum current capability of the SC-DCDC converter may not affected. Another advantage may be that the SC-DCDC of this disclosure may use dead-time instead of a skip pulse when the output load current is very small. For a low load condition, a single sub-switch for each switch, such as switches T1-T4, may deliver more current than needed. In low load current examples, the digital controller may enable dead-time techniques and modulate the charge time and discharge time. The dead-time techniques of this disclosure may have the advantage of improved output voltage ripple performance when compared to a "skip-pulse."

In more detail, the dead time may represent the difference between the calculated and minimum allowed conductance in terms of charge time and discharge time. Continuing the example described above in relation to FIG. 12B, the minimum conductance is when only one sub-switch for each switch in a switching network, such as switching network 102, may be needed for the output current. In the example of 12B, the minimum conductance is four. In the explanation of the example below, for clarity only charge time may be used in the equations, because charge time and discharge time will be assumed to be set equal. Dead-time may be determined according to the equation:

dead_time=$T$charge*(4−Conductance)/2.

The digital controller may calculate the duration of the charge phase (charge time) as reduced by half of the dead-time, according to the equations:

$T$charge_corrected=$T$charge−dead_time/2

$T$discharge_corrected=$T$discharge−dead_time/2

As one non-limiting, illustrative example, charge time and discharge time may be set to 18 clock cycles (e.g. a switching frequency of 1.85 MHz) and the digital controller computes conductance. In this case, the digital controller may determine that a low $I_{LOAD}$ requires a conductance of 2. The digital controller may determine dead-time according to the equation:

dead_time=18 cycles*(4−2)/2=18

Charge and discharge time may be reduced by nine clock cycles each. But the switching period remains the same.

Switches may need some time to close completely so the minimum charge/discharge time (maximum dead time) may need to be defined. In some examples, charge time may be set to a minimum of 4 clock cycles. This means maximum allowed dead time for this example is:

18−4+18−4=28

With a maximum allowed dead-time of 28 clock cycles, the skip pulse may not be performed until the load current $I_{LOAD}$ reduces down to:

$I$_min=(3.3V−2×1.3V)/(2×2×(3.2Ω+0.3Ω))*(18−14+18−14+6)/(18+18+18)=0.7/12.8*0.26=0.014
A=14 mA An example algorithm to calculate dead-time, using only four bits of difference for multiplication may be implemented as shown below:

error_4bit=floor((2^13-mod(Coductance_full_res, 2^13))/2/2^8);

dead_time=floor($T$charge_current_z1*(2^3*floor(mod(error_4 bit,2^4)/2^3)+2^2*floor(mod(error_4 bit,2^3)/2^2)+2^1*floor(mod(error_4 bit,2^2)/2^1)+2^0*floor(mod(error_4 bit,2^1)))/2^4)*2;

In this example algorithm: Conductance_full_res is 21 bit value. The 2^13 represents a 4 in terms of full resolution conductance and 4 bits are cut by division by 2^8.

As with the example described in relation to FIG. 12B, to obtain the same performance with a larger number of sub-switches for fine resolution implementation, each switch with bigger number of sub-switches. More sub-switches may require more routing from the digital to the analog sub macros and more area due to the large number of level-shifters required for going from the core domain of the digital part to the medium/high voltage domain of the switches.

Figure 16:
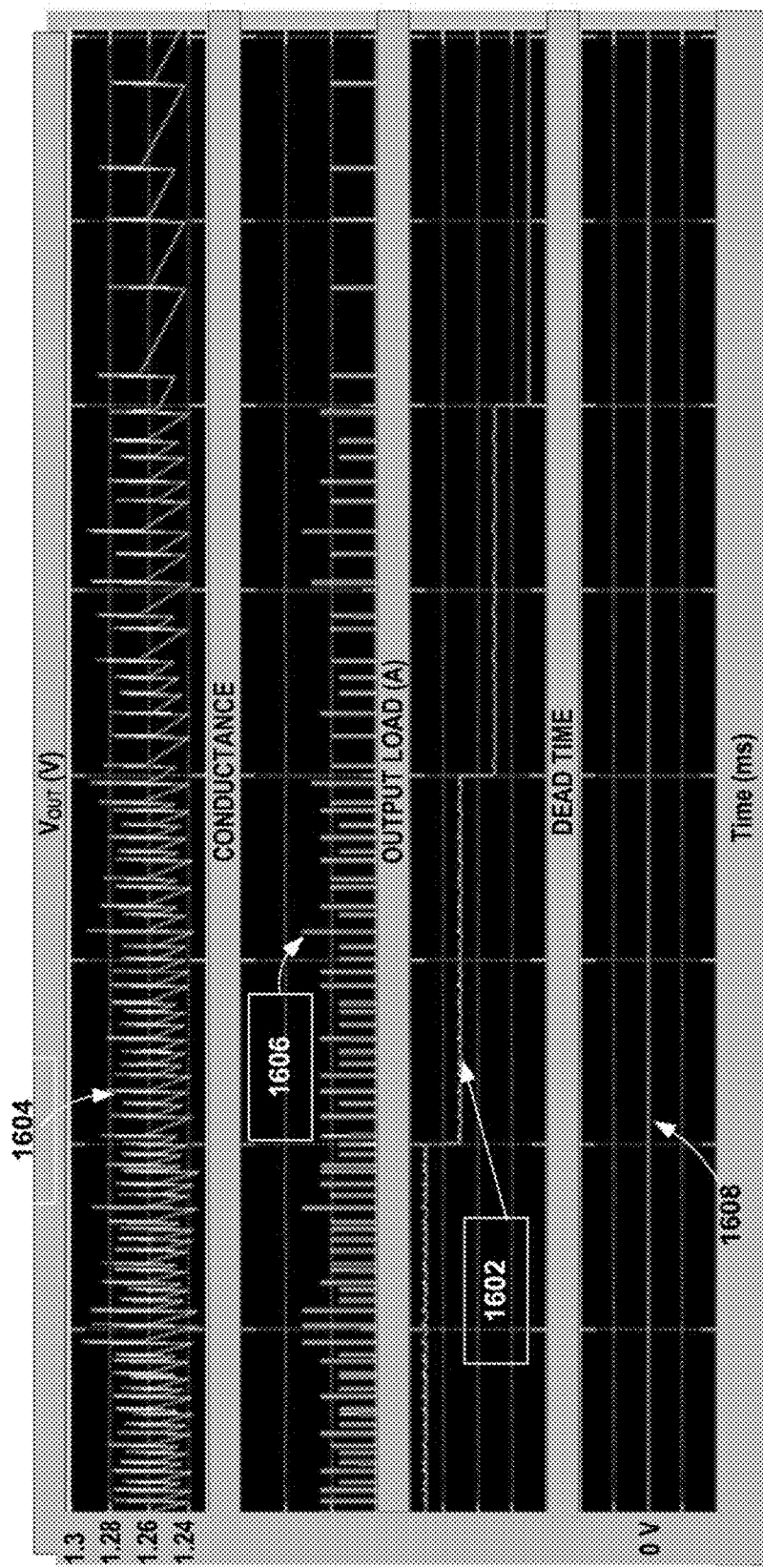
FIG. 16 is a time graph illustrating the result of output voltage ripple in an SC-DCDC converter where switch impedance modulation is used but has a dead-time duration of zero

FIG. 16 is a time graph illustrating the result of output voltage ripple in an SC-DCDC converter where switch impedance modulation is used but has a dead-time duration of zero. FIG. 16 is similar to FIG. 13 and illustrates the voltage ripple 1604 on the output voltage, such as Vout depicted in FIG. 11, the calculated conductance 1606, changes in the load current 1602 and the amount of dead time in a switching period 1608. The dead-time of FIG. 16 is zero ns. The steady state operation of the MATLAB simulation in FIGS. 16-17 is shown at 5V input voltage Vin with load currents of 70 mA, 50 mA, 30 mA and 10 mA, with each load jump performed in 10 ns.

Figure 17:
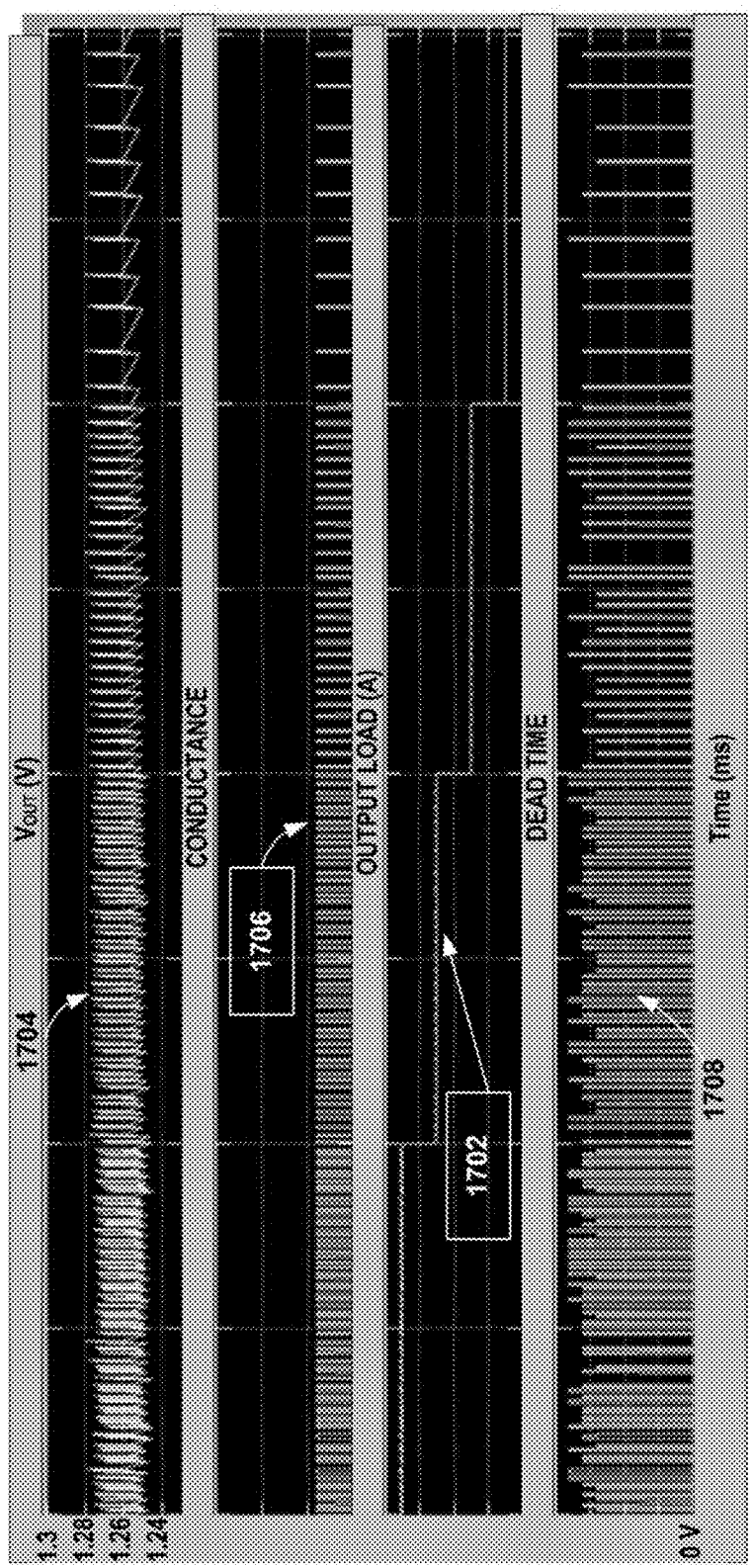
FIG. 17 is a time graph illustrating the result of output voltage ripple in an SC-DCDC converter where in addition to switch impedance modulation, a charge/discharge time modulation is performed.

FIG. 17 is a time graph illustrating the result of output voltage ripple in an SC-DCDC converter where in addition to switch impedance modulation, a charge/discharge time modulation is performed. FIG. 17 illustrates the voltage ripple 1704 on the output voltage, such as Vout depicted in FIG. 11, the calculated conductance 1706, changes in the load current 1702 and the amount of dead time in a switching period 1708. The output voltage ripple of FIG. 17 is ~20 mV smaller than the output voltage ripple of FIG. 16. In other words, the MATLAB simulation illustrates an advantage of improved voltage ripple performance for a circuit and digital controller that includes a dead-time in a switching period, especially for low load currents, according to one or more techniques of this disclosure.

Figure 18:
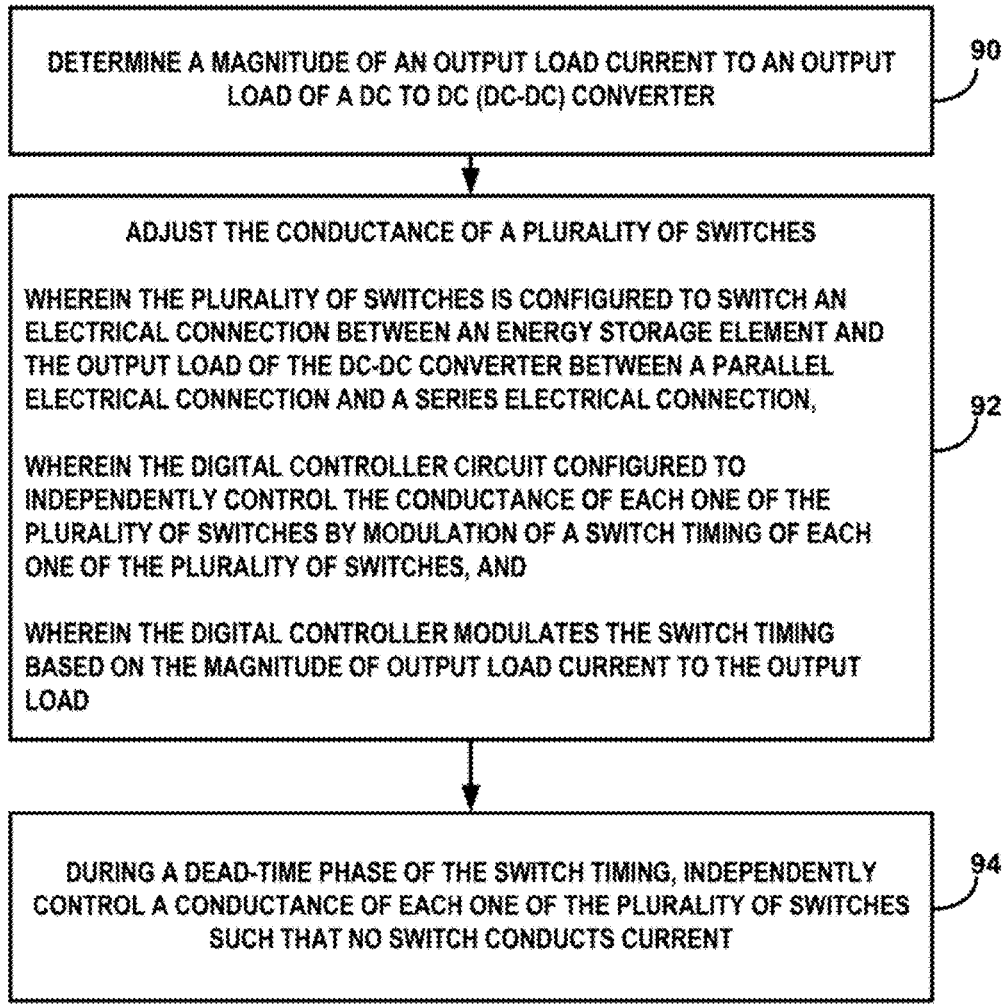
FIG. 18 is a flow diagram illustrating and example operation of a digital controller circuit for a DC-DC converter circuit, in accordance with one or more techniques of this disclosure.

FIG. 18 is a flow diagram illustrating and example operation of a digital controller circuit for a DC-DC converter circuit, in accordance with one or more techniques of this disclosure. The flow diagram of FIG. 18 will be described in relation to FIGS. 4, 5 12B and 15B, unless otherwise noted.

The digital controller circuit, such as digital controller 402, may determine the magnitude of the output load current to an output load of the DC-DC converter (90), for example as described above in relation to FIGS. 4 and 5. The magnitude of the output load current may change depending on the mode of operation of the load, as described above.

The digital controller circuit may independently adjust the conductance of a plurality of switches, such as sub-switches T1_0-T1_17, as shown in FIG. 12B (92). The digital controller may also independently adjust the conductance of the plurality of sub-switches that make up switches T2-T4. As described above, any of the switches T1-T4 may include a plurality of sub-switches. Similarly, any of the switches, such as the switches depicted in FIGS. 2A-2C, may include a plurality of sub-switches. The plurality of switches may be configured to switch an electrical connection between an energy storage element C2 and the output load $R_{LOAD}$ of the DC-DC converter between a parallel electrical connection and a series electrical connection.

The digital controller circuit may be configured to independently control the conductance of each one of the plurality of switches by modulation of a switch timing of each one of the plurality of switches (92). The digital controller circuit may modulate the switch timing based on the magnitude of output load current to the output load. The steps 90 and 92 are similar to the process steps as described above in relation to FIGS. 10A and 10B.

In some examples, the digital controller circuit may be configured to add a dead-time phase to the switching period (94). As described above in relation to FIG. 15B, during the dead-time phase the digital controller circuit may be configured to independently control conductance of each one of the plurality of switches such that no switch of the plurality of switches conducts current (94). Adding a dead-time phase may have the advantage of reducing the need for a skip pulse during low output load current, thereby reducing the amount of voltage ripple, as described above. In some examples, the duration of the dead-time phase is based on the magnitude of the output load current to the output load. As described above, the dead-time phase techniques may be combined with the fractional switch techniques describe in relation to FIG. 12B.

EXAMPLE 1

A system comprising: a direct current to direct current converter (DC-DC converter), including: an energy storage element, a first plurality of switches coupled to a first terminal of the energy storage element, wherein an on-resistance of at least one switch of the first plurality of switches is a multiple of an on-resistance of another switch of the first plurality of switches, and a second plurality of switches coupled to a second terminal of the energy storage element , wherein an on-resistance of at least one switch of the second plurality of switches is a multiple of an on-resistance of another switch of the second plurality of switches. The conductance of each one of the first and second plurality of switches is adjustable. The system may also include a digital controller configured to independently control the conductance of each one of the first and second plurality of switches to switch an electrical connection between the energy storage element and an output load of the DC-DC converter between a parallel electrical connection and a series electrical connection by modulation of a switch timing of each one of the first and second plurality of switches. The modulation of the switch timing is defined by adjustment of a gate-source voltage of each one of the first and second plurality of switches, and the digital controller is configured to program a first sub-set of the first and second plurality of switches to rest in a fixed state while a second sub-set of the first and second plurality of switches toggles states during a preset number of switching cycles.

EXAMPLE 2

The system of example 1, wherein the energy storage element is a first energy storage element, the DC-DC converter further comprising: a second energy storage element, and a third plurality of switches coupled to the second energy storage element. The second energy storage element is in series with the first energy storage element during a first switching configuration of the first, second and third plurality of switches, and the second energy storage element is in parallel with the first energy storage element during a second switching configuration of the first, second and third plurality of switches.

EXAMPLE 3

The system of any of examples 1-2 or any combination thereof, further comprising an output energy storage element coupled to the output load of the DC-DC converter, and wherein: the output energy storage element is in series with the first energy storage element and in series with the second energy storage element during a third switching configuration of the first, second and third plurality of switches. The output energy storage element is in parallel with the first energy storage element and in parallel with the second energy storage element during a fourth switching configuration of the first, second and third plurality of switches.

EXAMPLE 4

The system of any combination of examples 1-3, wherein the switch timing comprises a switching period, the switching period comprising a charge phase and a discharge phase, wherein a duration of the charge phase is substantially equal to a duration of the discharge phase, and wherein the digital controller is configured to add a dead-time phase to the switching period, wherein during the dead-time phase the digital controller is configured to adjust the gate-source voltage of each one of the first, second and third plurality of switches such that no switch conducts current.

EXAMPLE 5

The system of any combination of examples 1-4, wherein the digital controller is configured to independently control the conductance of each one of the first and second plurality of switches based on a magnitude of load current to the output load.

EXAMPLE 6

The system of any combination of examples 1-5, wherein the switch timing comprises a switching period, the switching period comprising a charge phase of the energy storage element and a discharge phase of the energy storage element, wherein a duration of the charge phase is substantially equal to a duration of the discharge phase.

EXAMPLE 7

The system of any combination of examples 1-6, wherein the digital controller is configured to add a dead-time phase to the switching period. During the dead-time phase the digital controller is configured to adjust the gate-source voltage of each one of the first and second plurality of switches such that no switch conducts current, and a duration of the dead-time phase is based on a magnitude of load current to the output load.

EXAMPLE 8

The system of any combination of examples 1-7, wherein a first duration of a first switching period, that includes a first duration dead-time phase, is approximately equal to a second duration of a second switching period that includes a second duration dead-time phase, wherein a duration of a charge phase of the second switching period is substantially equal to a duration of a discharge phase of the second switching period.

EXAMPLE 9

An apparatus comprising: an energy storage capacitor, a first plurality of transistors coupled to a first terminal of the energy storage capacitor, a second plurality of transistors coupled to a second terminal of the energy storage capacitor, and a digital controller configured to independently control the conduction of each one of the first and second plurality of transistors according to a switching period. The switching period comprises: a charge phase of the energy storage capacitor, a discharge phase of the energy storage capacitor, and a dead-time phase, wherein a duration of the charge phase is approximately equal to a duration of the discharge phase.

EXAMPLE 10

The apparatus of example 9, wherein a duration of the dead-time phase of the switching period is approximately equal to zero nanoseconds.

EXAMPLE 11

The apparatus of any combination of examples 9-10, wherein a duration of the dead-time phase of the switching period is based on a magnitude of output current to a load coupled to an output node of the apparatus.

EXAMPLE 12

The apparatus of any combination of examples 9-11, wherein the digital controller is configured to control the conduction of the first plurality and second plurality of transistors: into a first configuration during the charge phase, into a second configuration during the discharge phase, and into a third configuration during the dead-time phase such that no switch of the first and second plurality of switches conducts current.

EXAMPLE 13

The apparatus of any combination of examples 9-12, wherein the digital controller is configured to independently control the conductance of a particular one of the first and second plurality of transistors by control of rate of change of at least a rising edge of a conductance adjustment signal provided to the particular one of the first and second plurality of transistors, and wherein the digital controller is configured to program a first sub-set of the first and second plurality of transistors to rest in a fixed state while a second sub-set of the first and second plurality of transistors toggles states during a preset number of switching cycles.

EXAMPLE 14

The apparatus of any combination of examples 9-13, wherein further comprising a feedback loop, wherein an output voltage of the apparatus is fed back into the digital controller.

EXAMPLE 15

The apparatus of any combination of examples 9-14, wherein an on-resistance of at least one switch of the first plurality of switches is a multiple of an on-resistance of another switch of the first plurality of switches, wherein an on-resistance of at least one switch of the second plurality of switches is a multiple of an on-resistance of another switch of the second plurality of switches, and wherein the digital controller is configured to independently control the conduction of each one of the first and second plurality of transistors based on a magnitude of output current to a load coupled to an output node of the apparatus.

EXAMPLE 16

A digital controller circuit configured to independently control a conductance of each one of a plurality of switches by modulation of a switch timing of each one of the plurality of switches, wherein the plurality of switches is configured to switch an electrical connection between an energy storage element and an output load of a DC-DC converter between a parallel electrical connection and a series electrical connection, and wherein the digital controller modulates the switch timing based on a magnitude of output current to the output load.

EXAMPLE 17

The digital controller circuit of example 16, wherein the switch timing comprises a switching period and wherein the digital controller is further configured to add a dead-time phase to the switching period, wherein during the dead-time phase the digital controller is configured to independently control a conductance of each one of the plurality of switches such that no switch conducts current, and a duration of the dead-time phase is based on the magnitude of the output current to the output load.

EXAMPLE 18

The digital controller circuit of any combination of examples 16-17, wherein the plurality of switches comprises: a first plurality of switches coupled to a first terminal of the energy storage element, wherein an on-resistance of at least one switch of the first plurality of switches is a multiple of an on-resistance of another switch of the first plurality of switches, and a second plurality of switches coupled to a second terminal of the energy storage element, wherein an on-resistance of at least one switch of the second plurality of

33 switches is a multiple of an on-resistance of another switch of the second plurality of switches, wherein a conductance of each one of the first and second plurality of switches is adjustable.

EXAMPLE 19

A method comprising: determining, by a digital controller circuit, a magnitude of an output load current to an output load of a DC to DC (DC-DC) converter, adjusting, by the digital controller circuit, a conductance of a plurality of switches, wherein the plurality of switches is configured to switch an electrical connection between an energy storage element and the output load of the DC-DC converter between a parallel electrical connection and a series electrical connection, wherein the digital controller circuit configured to independently control the conductance of each one of the plurality of switches by modulation of a switch timing of each one of the plurality of switches, and wherein the digital controller circuit modulates the switch timing based on the magnitude of output load current to the output load.

EXAMPLE 20

The method of example 19, wherein the switch timing comprises a switching period and wherein the digital controller circuit is further configured to add a dead-time phase to the switching period, wherein: during the dead-time phase the digital controller circuit is configured to independently control the conductance of each one of the plurality of switches such that no switch of the plurality of switches conducts current, and a duration of the dead-time phase is based on the magnitude of the output load current to the output load.

EXAMPLE 21

The method of any combination of examples 19-20, wherein the plurality of switches comprises: a first plurality of switches coupled to a first terminal of the energy storage element, wherein an on-resistance of at least one switch of the first plurality of switches is a multiple of an on-resistance of another switch of the first plurality of switches, and a second plurality of switches coupled to a second terminal of the energy storage element, wherein an on-resistance of at least one switch of the second plurality of switches is a multiple of an on-resistance of another switch of the second plurality of switches, wherein a conductance of each one of the first and second plurality of switches is adjustable.

Various examples of the disclosure have been described. The specific features and steps are disclosed as representative examples of implementing the invention. These and other examples are within the scope of the following claims.

The invention claimed is:

1. A system comprising:
a direct current to direct current converter (DC-DC converter), including:
an energy storage element;
a first plurality of switches coupled to a first terminal of the energy storage element, wherein an on-resistance of at least one switch of the first plurality of switches is a multiple of an on-resistance of another switch of the first plurality of switches; and
a second plurality of switches coupled to a second terminal of the energy storage element, wherein an on-resistance of at least one switch of the second plurality of switches is a multiple of an on-resistance of another switch of the second plurality of switches; and
wherein a conductance of each one of the first and second plurality of switches is adjustable; and
a digital controller configured to independently control the conductance of each one of the first and second plurality of switches to switch an electrical connection between the energy storage element and an output load of the DC-DC converter between a parallel electrical connection and a series electrical connection by modulation of a switch timing of each one of the first and second plurality of switches,
wherein the modulation of the switch timing is defined by adjustment of a gate-source voltage of each one of the first and second plurality of switches, and
wherein the digital controller is configured to program a first sub-set of the first and second plurality of switches to rest in a fixed state while a second sub-set of the first and second plurality of switches toggles states during a preset number of switching cycles.

2. The system of claim 1, wherein the energy storage element is a first energy storage element, the DC-DC converter further comprising:
a second energy storage element; and
a third plurality of switches coupled to the second energy storage element, wherein:
the second energy storage element is in series with the first energy storage element during a first switching configuration of the first, second and third plurality of switches, and
the second energy storage element is in parallel with the first energy storage element during a second switching configuration of the first, second and third plurality of switches.

3. The system of claim 2, further comprising an output energy storage element coupled to the output load of the DC-DC converter, and wherein:
the output energy storage element is in series with the first energy storage element and in series with the second energy storage element during a third switching configuration of the first, second and third plurality of switches, and
the output energy storage element is in parallel with the first energy storage element and in parallel with the second energy storage element during a fourth switching configuration of the first, second and third plurality of switches.

4. The system of claim 3,
wherein the switch timing comprises a switching period, the switching period comprising a charge phase and a discharge phase, wherein a duration of the charge phase is substantially equal to a duration of the discharge phase, and
wherein the digital controller is configured to add a dead-time phase to the switching period, wherein during the dead-time phase the digital controller is configured to adjust the gate-source voltage of each one of the first, second and third plurality of switches such that no switch conducts current.

5. The system of claim 2, wherein the digital controller is configured to independently control the conductance of each one of the first and second plurality of switches based on a magnitude of load current to the output load.

6. The system of claim 1, wherein the switch timing comprises a switching period, the switching period comprising a charge phase of the energy storage element and a discharge phase of the energy storage element, wherein a duration of the charge phase is substantially equal to a duration of the discharge phase.

7. The system of claim 6, wherein the digital controller is configured to add a dead-time phase to the switching period, wherein:
during the dead-time phase the digital controller is configured to adjust the gate-source voltage of each one of the first and second plurality of switches such that no switch conducts current, and
a duration of the dead-time phase is based on a magnitude of load current to the output load.

8. The system of claim 7, wherein a first duration of a first switching period, that includes a first duration dead-time phase, is approximately equal to a second duration of a second switching period that includes a second duration dead-time phase, wherein a duration of a charge phase of the second switching period is substantially equal to a duration of a discharge phase of the second switching period.

9. An apparatus comprising:
an energy storage capacitor;
a first plurality of transistors coupled to a first terminal of the energy storage capacitor;
a second plurality of transistors coupled to a second terminal of the energy storage capacitor; and
a digital controller configured to independently control the conduction of each one of the first and second plurality of transistors according to a switching period, the switching period comprising:
a charge phase of the energy storage capacitor;
a discharge phase of the energy storage capacitor, wherein a duration of the charge phase is approximately equal to a duration of the discharge phase; and
a dead-time phase, wherein the first plurality of transistors and the second plurality of transistors do not conduct current during the dead-time phase, wherein the digital controller is configured to adjust a duration of the dead-time phase of the switching period to approximately equal to zero nanoseconds.

10. The apparatus of claim 9, wherein the duration of the dead-time phase of the switching period is based on a magnitude of output current to a load coupled to an output node of the apparatus.

11. The apparatus of claim 9, wherein the digital controller is configured to control the conduction of the first plurality and second plurality of transistors:
into a first configuration during the charge phase;
into a second configuration during the discharge phase; and
into a third configuration during the dead-time phase such that no switch of the first and second plurality of switches conducts current.

12. The apparatus of claim 9, wherein the digital controller is configured to independently control the conductance of a particular one of the first and second plurality of transistors by control of a rate of change of at least a rising edge of a conductance adjustment signal provided to the particular one of the first and second plurality of transistors, and wherein the digital controller is configured to program a first sub-set of the first and second plurality of transistors to rest in a fixed state while a second sub-set of the first and second plurality of transistors toggles states during a preset number of switching cycles.

13. The apparatus of claim 9, further comprising a feedback loop, wherein an output voltage of the apparatus is fed back into the digital controller.

14. The apparatus of claim 9,
wherein an on-resistance of at least one switch of the first plurality of switches is a multiple of an on-resistance of another switch of the first plurality of switches,
wherein an on-resistance of at least one switch of the second plurality of switches is a multiple of an on-resistance of another switch of the second plurality of switches, and
wherein the digital controller is configured to independently control the conduction of each one of the first and second plurality of transistors based on a magnitude of output current to a load coupled to an output node of the apparatus.

15. A digital controller circuit configured to independently control a conductance of each one of a plurality of switches by modulation of a switch timing of each one of the plurality of switches,
wherein the plurality of switches is configured to switch an electrical connection between an energy storage element and an output load of a DC-DC converter between a parallel electrical connection and a series electrical connection, and
wherein the digital controller is configured to modulate the switch timing based on a magnitude of output current to the output load, and wherein the switching timing comprises a switching period comprising:
a charge phase of the energy storage capacitor;
a discharge phase of the energy storage capacitor, wherein a duration of the charge phase is approximately equal to a duration of the discharge phase, and
a dead-time phase, wherein the digital controller is configured to adjust a duration of the dead-time phase to approximately equal to zero nanoseconds.

16. The digital controller circuit of claim 15, wherein:
during the dead-time phase the digital controller is configured to independently control a conductance of each one of the plurality of switches such that no switch conducts current, and
the duration of the dead-time phase is based on the magnitude of the output current to the output load.

17. The digital controller circuit of claim 15, wherein the plurality of switches comprises:
a first plurality of switches coupled to a first terminal of the energy storage element, wherein an on-resistance of at least one switch of the first plurality of switches is a multiple of an on-resistance of another switch of the first plurality of switches; and
a second plurality of switches coupled to a second terminal of the energy storage element, wherein an on-resistance of at least one switch of the second plurality of switches is a multiple of an on-resistance of another switch of the second plurality of switches;
wherein a conductance of each one of the first and second plurality of switches is adjustable.

18. A method comprising:
determining, by a digital controller circuit, a magnitude of an output load current to an output load of a DC to DC (DC-DC) converter;
adjusting, by the digital controller circuit, a conductance of a plurality of switches,
wherein the plurality of switches is configured to switch an electrical connection between an energy storage element and the output load of the DC-DC converter between a parallel electrical connection and a series electrical connection, wherein the digital controller circuit configured to independently control the conductance of each one of the plurality of switches by modulation of a switch timing of each one of the plurality of switches, and wherein the digital controller circuit modulates the switch timing based on the magnitude of output load current to the output load, and wherein the switching timing comprises a switching period comprising:

a charge phase of the energy storage capacitor;

a discharge phase of the energy storage capacitor, wherein a duration of the charge phase is approximately equal to a duration of the discharge phase; and a dead-time phase, wherein the digital controller is configured to adjust a duration of the dead-time phase to approximately equal to zero nanoseconds.

19. The method of claim 18, wherein:

during the dead-time phase the digital controller circuit is configured to independently control the conductance of each one of the plurality of switches such that no switch of the plurality of switches conducts current, and the duration of the dead-time phase is based on the magnitude of the output load current to the output load.

20. The method of claim 18, wherein the plurality of switches comprises:

a first plurality of switches coupled to a first terminal of the energy storage element, wherein an on-resistance of at least one switch of the first plurality of switches is a multiple of an on-resistance of another switch of the first plurality of switches; and a second plurality of switches coupled to a second terminal of the energy storage element, wherein an on-resistance of at least one switch of the second plurality of switches is a multiple of an on-resistance of another switch of the second plurality of switches;

wherein a conductance of each one of the first and second plurality of switches is adjustable.

* * * * *